United States Patent
Kouru et al.

(10) Patent No.: US 12,047,471 B2
(45) Date of Patent: *Jul. 23, 2024

(54) INTEGRATION FRAMEWORK AND USER INTERFACE FOR EMBEDDING TRANSFER SERVICES INTO APPLICATIONS

(71) Applicant: The Western Union Company, Denver, CO (US)

(72) Inventors: Vijaya Kouru, Cupertino, CA (US); Sanjay Saraf, San Jose, CA (US)

(73) Assignee: THE WESTERN UNION COMPANY, Denver, CO (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/667,014

(22) Filed: Feb. 8, 2022

(65) Prior Publication Data
US 2022/0166844 A1 May 26, 2022

Related U.S. Application Data

(63) Continuation of application No. 16/459,172, filed on Jul. 1, 2019, now Pat. No. 11,258,875, which is a (Continued)

(51) Int. Cl.
H04L 67/568 (2022.01)
H04L 67/01 (2022.01)
(Continued)

(52) U.S. Cl.
CPC ............ *H04L 67/568* (2022.05); *H04L 67/06* (2013.01); *H04L 67/60* (2022.05); *H04L 67/01* (2022.05); *H04L 67/1097* (2013.01)

(58) Field of Classification Search
CPC ....... H04L 67/568; H04L 67/06; H04L 67/60; H04L 67/01; H04L 67/1097
See application file for complete search history.

(56) References Cited

U.S. PATENT DOCUMENTS 7,012,919 B1 3/2006 So et al.
9,298,806 B1 3/2016 Vessenes et al.
(Continued)

FOREIGN PATENT DOCUMENTS

JP 2002007596 A 1/2002

OTHER PUBLICATIONS

Maurer, Bill, "Retail Electronic Payments Systems for Value Transfers in the Developing World," Dept of Anthropology, University of California, Irvine, (Year:2008), 31 pages.

*Primary Examiner* — Farzana B Huq
(74) *Attorney, Agent, or Firm* — Kilpatrick Townsend & Stockton LLP

(57) ABSTRACT

Techniques are disclosed for providing secure transaction functionality embedded into host applications executing on transaction client devices, using an integration framework and user interfaces. A transaction server may be configured to receive initial transaction sender and receiver data from an integrated software component executing within a host software application on a transaction client device. After receiving the initial transaction sender and receiver data from the integrated software component, the transaction server may determine transaction sender and transaction recipient locations, and may select a particular transaction user interface based on the sender and recipient location data. Particular transaction user interface also may be determined based on specific host applications. After determining the particular transaction user interface, the interface may be transmitted to the transaction client device, for example, via a content delivery network.

20 Claims, 12 Drawing Sheets

Related U.S. Application Data continuation of application No. 15/299,951, filed on Oct. 21, 2016, now Pat. No. 10,367,905.

(60) Provisional application No. 62/244,745, filed on Oct. 22, 2015.

(51) Int. Cl.
*H04L 67/06* (2022.01)
*H04L 67/1097* (2022.01)
*H04L 67/60* (2022.01)

(56) References Cited

U.S. PATENT DOCUMENTS

| | | |
|---|---|---|
| 10,367,905 B2 | 7/2019 | Kouru et al. |
| 2003/0028481 A1 | 2/2003 | Flitcroft et al. |
| 2009/0089193 A1* | 4/2009 | Paintin .................. G06Q 30/04 |
| | | 705/40 |
| 2009/0204772 A1 | 8/2009 | Kolze |
| 2012/0203663 A1* | 8/2012 | Sinclair .................. G06Q 30/06 |
| | | 713/168 |
| 2014/0156435 A1* | 6/2014 | Rahman ............... G06Q 20/385 |
| | | 705/44 |
| 2014/0201070 A1 | 7/2014 | Liberty |
| 2016/0210631 A1 | 7/2016 | Ramasubramanian et al. |
| 2017/0118301 A1 | 4/2017 | Kouru et al. |
| 2018/0152845 A1* | 5/2018 | Unnerstall ......... G06Q 20/3224 |
| 2018/0253559 A1 | 9/2018 | Satpathy et al. |
| 2020/0382764 A1 | 12/2020 | Oyman et al. |

* cited by examiner

INTEGRATION FRAMEWORK AND USER INTERFACE FOR EMBEDDING TRANSFER SERVICES INTO APPLICATIONS

CROSS-REFERENCES TO RELATED APPLICATIONS

The present application is a continuation of U.S. patent application Ser. No. 16/459,172, filed Jul. 1, 2019, now U.S. Pat. No. 11,258,875, which is a continuation of U.S. patent application Ser. No. 15/299,951, filed Oct. 21, 2016, now U.S. Pat. No. 10,367,905, which is a non-provisional of and claims priority to U.S. Provisional Patent Application No. 62/244,745, filed Oct. 22, 2015, the entire contents of each of which are incorporated herein by reference for all purposes.

BACKGROUND

Field

The present invention relates generally to receiving and handling secure transfers between devices at different locations or domains within electronic transfer networks.

Description of the Related Art

Within electronic data transfer networks, one or more central transfer servers along with various intermediary computing infrastructure and communication networks may be used to initiate and perform secure transfers between sender devices and receiver devices. In some cases, sender devices and receiver devices for a requested transfer may operate at separate locations or domains with a larger transfer system, and thus may have different networks and different subsets of available resources may be available to the different devices within the requested transaction. Central transfer servers and other computing systems may determine and assign resources for performing requested transfers. Moreover, such transfer between different locations or domains may be subject to different rules with respect to risk and compliance depending on sender and recipient locations.

SUMMARY

Aspects described herein providing secure transfers between transaction client devices at different locations or domains within electronic transfer networks. Specifically, various techniques (e.g., systems, methods, computer-program products tangibly embodied in a non-transitory computer-readable storage medium, etc.) described herein relate to providing secure transaction functionality embedded into host applications executing on transaction client devices, using an integration framework and user interfaces. In some embodiments, a transaction server may be configured to receive initial transaction data (e.g., transaction sender and receiver data) from an integrated software component executing within a host software application on a transaction client device (e.g., a mobile device). For example, a widget or other specialized software component configured to provide secure transactions may be embedded within a communication application, such as a messaging, gaming, or social networking application, executing on mobile device. After receiving the transaction sender and receiver data from the integrated software component executing within the host application on the client device, the transaction server may determine transaction sender and transaction recipient locations, and may select a particular transaction user interface based on the sender and recipient location data. In some examples, the particular transaction user interface also may be determined based on the specific host application, thus providing support within the integration framework for providing integrated and secure transaction user interfaces that are sender location and receiver location specific and/or partner specific.

Additional techniques are described herein for providing the particular transaction user interface to the transaction client device. In some embodiments, the transaction server may upload a plurality of transaction user interfaces to a content delivery network (CDN). In such cases, the transaction server may provide a particular transaction user interface determined for a particular transaction client, by identifying a number of CDN servers hosting a current (e.g., not expired) version of the particular transaction user interface. The transaction server then may determine a particular CDN server based on geographic location and/or other factors, and transmit a link that allows the integrated application to download the transaction user interface directly from the particular CDN server. After receiving and rendering the particular transaction user interface within the software component integrated within the host application, the integrated software component may receive input data via the transaction user interface and securely transmit a corresponding transaction request to the transaction server.

Figure 1:
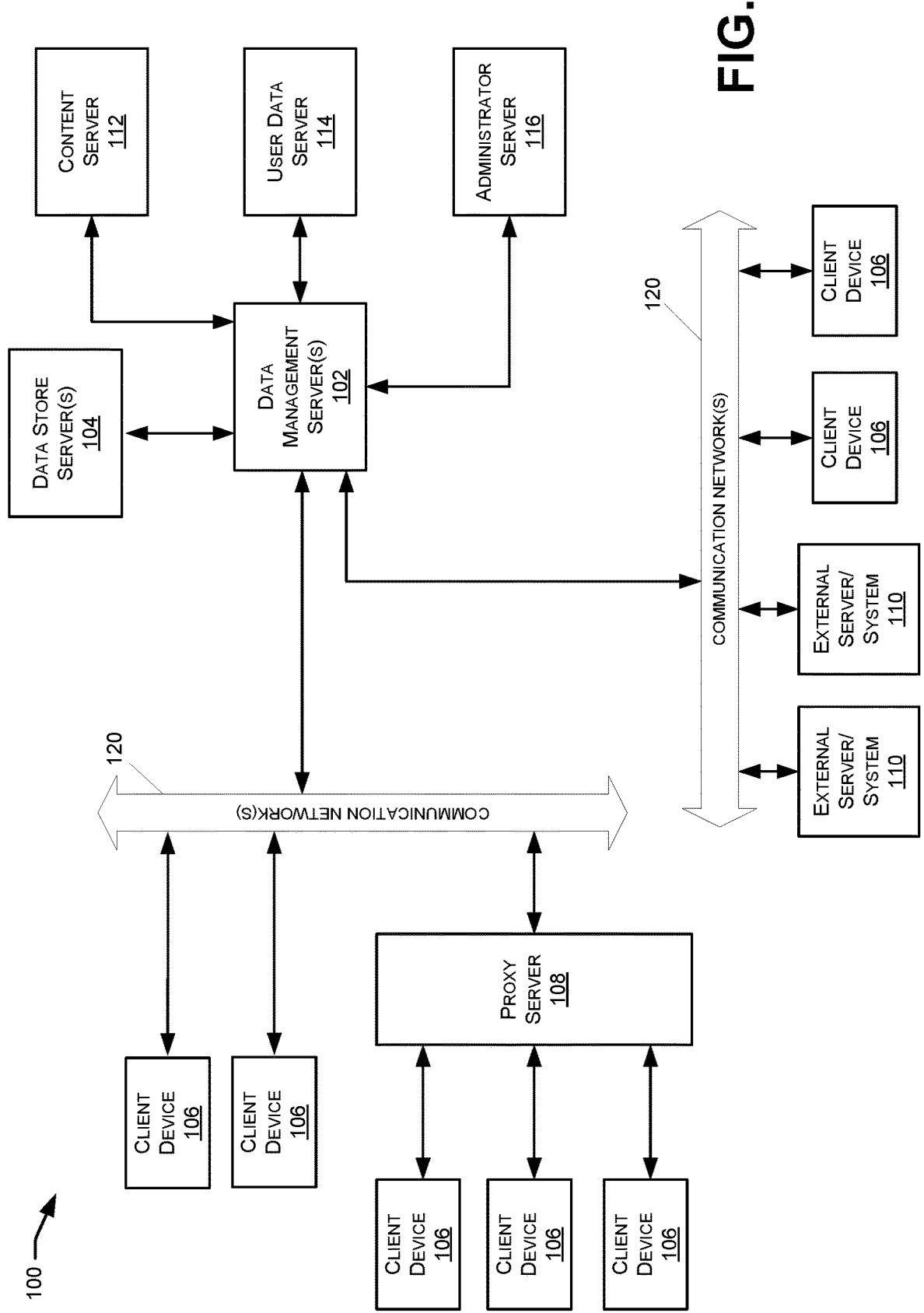
FIG. 1 is a block diagram illustrating an example of an electronic data transfer network, according to one or more embodiments of the disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for providing secure transaction functionality embedded into host applications executing on transaction client devices, using an integration framework and user interfaces. In some embodiments, a transaction server may be configured to receive initial transaction data (e.g., transaction sender and receiver data) from an integrated software component executing within a host software application on a transaction client device (e.g., a mobile device). For example, a widget or other specialized software component configured to provide secure transactions may be embedded within a communication application, such as a messaging, gaming, or social networking application, executing on mobile device. After receiving the transaction sender and receiver data from the integrated software component executing within the host application on the client device, the transaction server may determine transaction sender and transaction recipient locations, and may select a particular transaction user interface based on the sender and recipient location data. In some examples, the particular transaction user interface also may be determined based on the specific host application, thus providing support within the integration framework for providing integrated and secure transaction user interfaces that are sender location and receiver location specific and/or partner specific.

Additional techniques are described herein for providing the particular transaction user interface to the transaction client device. In some embodiments, the transaction server may upload a plurality of transaction user interfaces to a content delivery network (CDN). In such cases, the transaction server may provide a particular transaction user interface determined for a particular transaction client, by identifying a number of CDN servers hosting a current (e.g., not expired) version of the particular transaction user interface. The transaction server then may determine a particular CDN server based on geographic location and/or other factors, and transmit a link that allows the integrated application to download the transaction user interface directly from the particular CDN server. After receiving and rendering the particular transaction user interface within the software component integrated within the host application, the integrated software component may receive input data via the transaction user interface and securely transmit a corresponding transaction request to the transaction server.

With reference now to FIG. 1, a block diagram is shown illustrating various components of an electronic transfer network 100 which implements and supports certain embodiments and features described herein. As discussed below in more detail, various embodiments of electronic transfer networks 100 may be implemented and configured to perform secure transactions via an integration framework and software component embedded within host applications executing on client devices 106. In some embodiments, the various computing devices and systems shown in FIG. 1 may correspond to different physical or virtual domains/regions, for instance, different geographic areas within different jurisdictions, different data centers, different networks, different computing infrastructures, etc. As described herein, secure transactions (or secure transfers) may include transfers of various different types of data items (e.g., files, database records, media or other content resources, etc.), as well as other secure data transactions or other interactions between a sender and receiver devices/servers. In some embodiments, the electronic transfer network 100 may be configured to operate as a value transfer system by which users at client devices 106 may initiate value transfers to users at other client devices 106. In such cases, management servers 102 and/or external systems 110 may correspond to secure systems operated by financial institutions or other entities, by which sender and receiver credentials and value transfer requests may be received and analyzed, and value-based transactions may be authorized and performed.

Thus, in various embodiments, electronic transfer network 100 may be configured to support and perform transfers of various currency types, including traditional and/or digital currencies, centralized and/or de-centralized currencies, cryptocurrencies, and any other medium of exchange (e.g., credit, gift cards or certificates, points in a user point system, etc.), between client devices 106 and/or external systems 110 in different areas, regions, or jurisdictions. In other embodiments, the electronic transfer network 100 may be configured to perform other types of multi-party data transfers and/or secure transactions, such as transfers of data items including secure files, records, and/or content resources, between client devices 106 and other client devices 106, management servers 102 and/or external systems 110. For such transfers, the endpoint systems may be operating in the same location, using the same communication networks 120, and/or using the same computing hardware and software infrastructure, or may operate in different locations, on different networks, and/or in different datacenters, etc. Data management servers 102 and relate servers (e.g., 104, 108, 112, 114, 116, etc.) in some embodiments, may correspond to authentication systems, data access/permission systems, subscription monitor systems, network access providers, and/or any other servers that may be used to monitor, permit/deny access, and/or enable data transfers. In still other embodiments, network 100 may be implemented as part of interactive gaming systems, educational and profession training systems, and/or social network systems, to enable the transfer of certain data or values (e.g., points, credits, resources, etc.) between users on different systems and/or in different locations.

As shown in FIG. 1, electronic transfer network 100 may include one or more data management servers 102. Data management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Data management servers 102 may include one or more server farms, clusters, or any other appropriate arrangement and/or combination or computer servers. Data management servers 102 may act according to stored instructions located in a memory subsystem of the servers 102, and may run an operating system, including any commercially available server operating system and/or any other operating systems discussed herein.

The electronic transfer network 100 may include one or more data store servers 104, such as database servers and file-based storage systems. Data stores 104 may comprise stored data relevant to the functions of the electronic transfer network 100. Illustrative examples of data stores 104 that may be maintained in certain embodiments of the electronic transfer network 100 are described below in reference to FIG. 4. In some embodiments, multiple data stores may reside on a single server 104, either using the same storage components of server 104 or using different physical storage components to assure data security and integrity between data stores. In other embodiments, each data store may have a separate dedicated data store server 104.

Electronic transfer network 100 also may include one or more client devices 106. Client devices 106 may display data received via the electronic transfer network 100, and may support various types of user interactions with the data. Client devices 106 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other client devices 106 may be general purpose personal computers or special-purpose computing devices including, by way of example, personal computers, laptop computers, workstation computers, projection devices, and interactive room display systems. Additionally, client devices 106 may be any other electronic devices, such as thin-client computers, Internet-enabled gaming systems, business or home appliances, and/or personal messaging devices, capable of communicating over network(s) 120. In some embodiments, one or more client devices 106 may include digital kiosk devices such as point-of-sale terminals, value transfer terminals, and/or digital advertising or display devices, including some or all of the features described below in reference to FIG. 2.

In different contexts of electronic transfer networks 100, client devices 106 may correspond to different types of specialized devices, for example, employee devices and presentation devices in a company network, gaming devices in a gaming network, networked point-of-sale terminals or digital advertising terminals in a retail network, etc. In some embodiments, client devices 106 may operate in the same physical location, such as the conference room or same retail store location. In such cases, the devices 106 may contain components that support direct communications with other nearby devices 106, such as a wireless transceivers and wireless communications interfaces, Ethernet sockets or other Local Area Network (LAN) interfaces, etc. In other implementations, the client devices 106 need not be used at the same physical location, but may be used in remote geographic locations in which each client device 106 may use security features and/or specialized hardware (e.g., hardware-accelerated SSL and HTTPS, WS-Security, firewalls, etc.) to communicate with the data management server 102 and/or other remotely located client devices 106. Additionally, different client devices 106 may be assigned different designated roles, such as sender devices, receiver devices, administrator devices, or the like, and in such cases the different devices may be provided with additional hardware and/or software components to provide content and support user capabilities not available to the other devices.

The electronic transfer network 100 also may include one or more proxy servers 108 configured to operate between a set of related client devices 106 and the back-end server(s) 102. In some cases, proxy server 108 may maintain private user information for client devices 106 interacting with applications or services hosted on other servers. For example, the proxy server 108 may be used to maintain private data of a user within one jurisdiction even though the user is accessing an application hosted on a server (e.g., the data management server 102) located outside the jurisdiction. In such cases, the proxy server 108 may intercept communications between multiple different client devices 106 and/or other devices that may include private user information. The proxy server 108 may create a token or identifier that does not disclose the private information and may use the token or identifier when communicating with the other servers and systems, instead of using the user's private information.

The electronic transfer network 100 also may include one or more external servers/systems 110 configured to connect to the back-end server(s) 102 through various communication networks 120 and/or through proxy servers 108. External servers/systems 110 may include some or all of the same physical and logical components as the data management server(s) 102, and may be configured to provide various data sources and/or services to the other components of the electronic transfer network 100.

As illustrated in FIG. 1, the data management server 102 may be in communication with one or more additional servers, such as a content server 112, a user data server 112, and/or an administrator server 116. Each of these servers may include some or all of the same physical and logical components as the data management server(s) 102, and in some cases, the hardware and software components of these servers 112-116 may be incorporated into the data management server(s) 102, rather than being implemented as separate computer servers.

Content server 112 may include hardware and software components to generate, store, and maintain the content resources for distribution to client devices 106 and other devices in the network 100. For example, in electronic transfer networks 100 used for professional training and educational purposes, content server 112 may include data stores of training materials, presentations, interactive programs and simulations, and various training interfaces that correspond to different materials and/or different types of user devices 106. In content electronic transfer networks 100 used for distribution of media content, advertising, and the like, a content server 112 may include media and advertising content files.

User data server 114 may include hardware and software components that store and process data for multiple users relating to each user's activities and usage of the electronic transfer network 100. For example, the data management server 102 may record and track each user's system usage, including their client device 106, data accessed and transferred, and interactions with other client devices 106. This data may be stored and processed by the user data server 114, to support user tracking and analysis features. For instance, in business training contexts, the user data server 114 may store and analyze each user's training materials viewed, courses completed, interactions, and the like. In the context of advertising, media distribution, and interactive gaming, the user data server 114 may store and process resource access data for multiple users (e.g., transactions initiated, sent, and received, data files accessed, access times, data usage amounts, user histories, user devices and device types, etc.).

Administrator server 116 may include hardware and software components to initiate various administrative functions at the data management server 102 and other components within the content distribution network 100. For example, the administrator server 116 may monitor device status and performance for the various servers, data stores, and/or client devices 106 in the electronic transfer network 100. When necessary, the administrator server 116 may add or remove devices from the network 100, and perform device maintenance such as providing software updates to the devices in the network 100. Various administrative tools on the administrator server 116 may allow authorized users to set user access permissions to various data resources, monitor resource usage by users and devices 106, and perform analyses and generate reports on specific network users and/or devices (e.g., resource usage tracking reports, training evaluations, etc.).

The electronic transfer network 100 may include one or more communication networks 120. Although two networks 120 are identified in FIG. 1, the electronic transfer network 100 may include any number of different communication networks between any of the computer servers and devices shown in FIG. 1 and/or other devices described herein. Communication networks 120 may enable communication between the various computing devices, servers, and other components of the electronic transfer network 100. As discussed below, various implementations of electronic transfer networks 100 may employ different types of networks 120, for example, computer networks, telecommunications networks, wireless networks, and/or any combination of these and/or other networks.

As noted above, in certain embodiments, electronic transfer network 100 may be a cryptocurrency network or other network using encryption protocols and techniques for performing transfers of cryptocurrency and/or other alternative digital currencies. Illustrative and non-limiting examples of such cryptocurrency networks may include a bitcoin peer-to-peer (P2P) payment network, a Litecoin network, a Peercoin network, and various other private digital cryptocurrency networks. The various computing devices and servers in such cryptocurrency networks 100, including client devices 106, management servers 102, and/or external systems 110, may be configured to perform cryptocurrency transfers as senders and/or receivers. For example, a client device 106 may securely store a private cryptographic key associated with a cryptocurrency account of a user, and may use specialized client software (e.g., cryptocurrency wallet application) to generate digital cryptographic signatures using the private cryptographic key and data identifying the details of the requested cryptocurrency transfer. In some cases, the cryptocurrency client application may execute a cryptographic hash function to generate a hash value signature based on the private key value associated with the cryptocurrency account. Recipient client devices 106, as well as other servers/systems in the network 100, may use the public key of the sender to decrypt the cryptographic signature and verify the authenticity of the requested cryptocurrency transfer. Some or all of the client devices 106, servers 102, and/or external systems 110 may use databases or other secure storage to independently maintain and update electronic ledgers for tracking the current balances associated with cryptocurrency accounts.

In some embodiments, certain computing devices and servers in a cryptocurrency network 100 may function as miner systems that are configured to perform complex mathematical operations in order to produce new cryptocurrency. Thus, various client devices 106, servers 102, and/or external systems 110 may be implemented as cryptocurrency miners. In some cases, these devices/systems may include specialized hardware and software designed for cryptocurrency mining, such as application-specific integrated circuits (ASICs) that are specifically designed and configured for cryptocurrency mining and/or specialized cryptocurrency mining software. In some cases, specialized cryptocurrency mining software may be used to allow collaboration between multiple different devices/systems which may function as a mining pool.

In some embodiments, various computing devices and servers in a cryptocurrency network 100 may be configured to collaboratively generate and store universal public ledgers and/or transaction chains for the cryptocurrency network 100. For example, computing devices and systems within the cryptocurrency network 100 may be configured to retrieve individual cryptocurrency transactions from a pool and resolve the transactions by solving associated mathematical problems, such as cryptographic hashes. After the problem is solved, the associated cryptocurrency transaction may be added to a universal transaction chain which is shared by other devices and systems of the cryptocurrency network 100. Each device/system in the cryptocurrency network 100 may independently maintain a copy of the transaction chain, and may periodically (or upon request from other systems) share their copy of the transaction chain in order to synchronize and reconcile different versions.

In some embodiments, a transaction chain for a cryptocurrency system/network may be stored in a distributed database by multiple different data nodes at different devices/servers within the network 100. For example, blockchain technology may be used to implement a decentralized distributed database which may be hosted by a combination of client devices 106, data management servers 102, and/or external systems 110. The blockchain (or other decentralized storage system) may store a distributed electronic ledger and/or universal transaction chain for the cryptocurrency network 100. The blockchain may be accessed by individual client software (e.g., wallet applications) of client devices 106, which may propose a cryptocurrency value transfer to be added to the blockchain. After analyzing and authorizing the requested transfer (e.g., by confirming that there is sufficient cryptocurrency value in the sender's account), a miner node within the cryptocurrency network 100 may bundle the transfer with other transactions to create a new block to be added to the blockchain. In some cases, adding blocks to the blockchain may involve miner nodes repeatedly executing cryptographic hash functions, ensuring that the blockchain cannot be tampered with by any malicious systems within the network 100.

As noted above, the client devices 106 in the electronic transfer network 100 may include various mobile devices, such as smartphones, tablet computers, personal digital assistants, wearable computing devices, bodily implanted communication devices, vehicle-based devices, etc. Within an electronic transfer network 100, mobile devices 106 may be configured to support mobile payment and/or mobile money transfer functionality. Such mobile devices 106 may initiate and receive communications via the Internet, e-mail, short message service (SMS), Bluetooth®, mobile radio-frequency identification (M-RFID), near-field communication (NFC) and/or various other communication protocols. In some cases, mobile devices 106 may execute a mobile wallet application to store user data and support secure data and/or value transfers via various different techniques, for example, SMS-based transactional payments, direct mobile billing, Web Application Protocol mobile payments, and NFC-based payments.

In some examples, the electronic transfer network 100 shown in FIG. 1 may correspond to an interactive user platform, such as a social networking platform, messaging platform, and/or gaming platform. In such cases, an electronic transfer technology platform may be integrated within the social networking, messaging and/or gaming platform 100, in order to provide interactive users with the capabilities to perform quick and convenient value transfers with other users anywhere in the world. Such embodiments may apply to various different collaborative user platforms and applications, including social media applications, email applications, chat and messaging applications, online gaming applications, and the like. These applications may be executed on client devices 106 and may transmit communications to and/or establish communication sessions with corresponding applications on other client devices 106 and/or external systems 110. In some embodiments, the secure data and/or value transfer capabilities of one or more transfer services providers may be embedded into various collaborative user platforms. For example, from within a social networking or messaging application running on client device 106, a user may be able to request and fund value transfers utilizing a debit card, credit card, or bank account, and easily direct the funds to another user on the same collaborative platform, or to retail agent location and/or to a mobile wallet or bank account. Integration of secure value transfer technologies within social networking applications, messaging applications, and the like, may provide a cross-border platform for transfer services that enables pay-in and pay-out capabilities that leverage technology, foreign exchange conversion, data management, as well as regulatory, compliance and anti-money laundering (AML) infrastructure of the transfer service provider, to expedite efficient and timely transfers. In such cases, the technology platform used to support secure data and/or value transfers within the network 100 may be accessible to messaging, social, and other digital networks, and may offer a suite of APIs built on a highly scalable infrastructure, enabling fast deployment of domestic and cross-border remittance capabilities.

Figure 2:
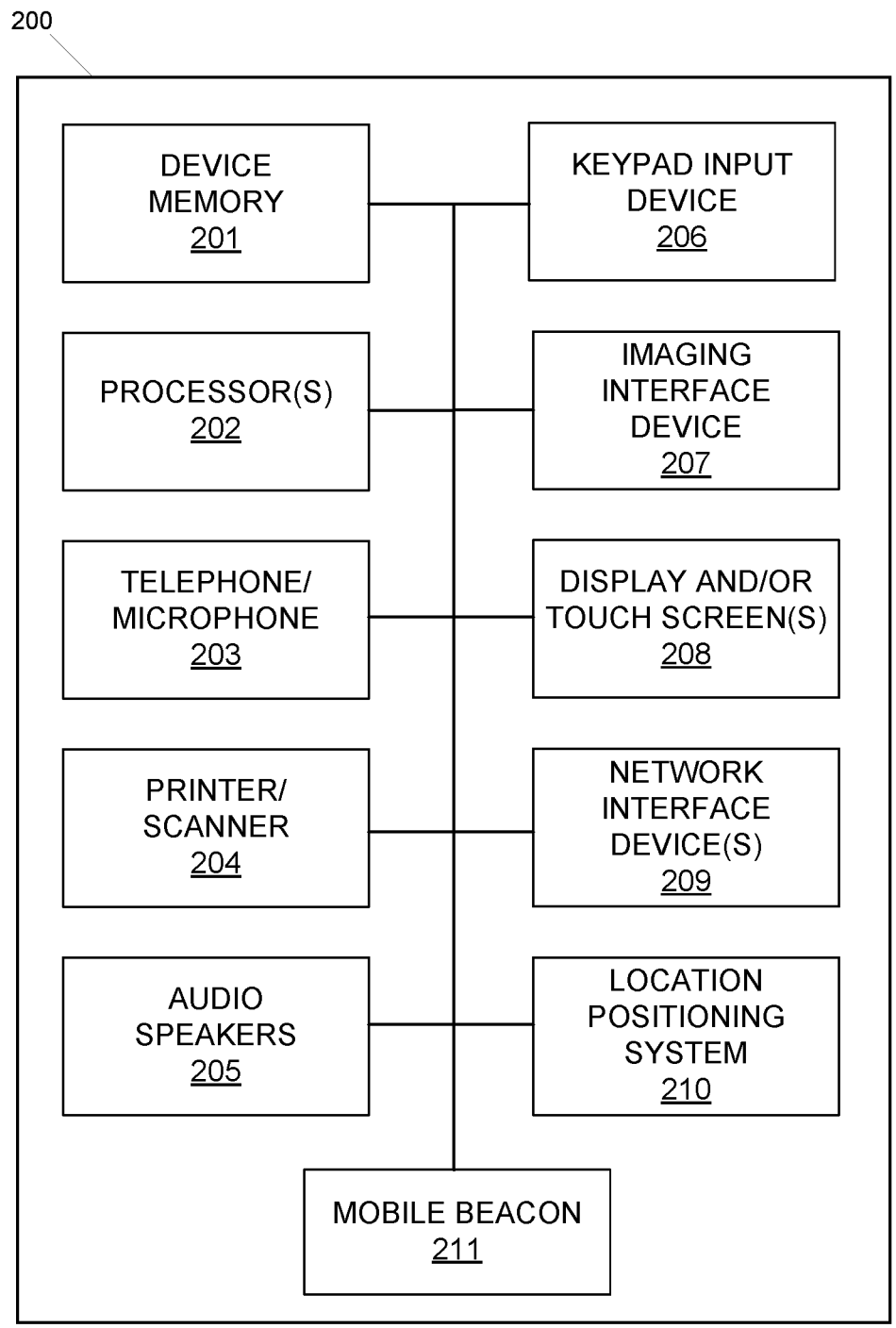
FIG. 2 is a block diagram illustrating various components and features of an example transaction client device, according to one or more embodiments of the disclosure.

Referring now to FIG. 2, a simplified block diagram is illustrating showing a digital kiosk device 206. In some embodiments, digital kiosk devices 206 may be another example of client devices 106. The digital kiosk device 206 may be implemented, for example, as a kiosk in a retail store, a value transfer terminal for performing value transfers (e.g., transfers of money and other assets, submitting payments to payees, etc.), a point-of-sale terminal, an electronic advertising system, and/or other various electronic display systems. The digital kiosk device 206 may be operated by a user (e.g., customer, shopper), and/or by agent, employee, or representative of a business providing or operating the kiosk 206. In various embodiments, the digital kiosk device 206 may include one or more of: a memory system 210, a processing unit 211, a telephone/microphone I/O component system 212, a printer/scanner I/O component system 213, an audio speaker system 214, a keypad input device 215, an imaging interface device 216, one or more digital display screens 217, one or more network interface devices 218 (e.g., network interface controllers, RF transceivers, etc.), and a digital positioning system 219 (e.g., Global Positioning System (GPS) receiver device). In various embodiments, digital kiosk devices 206 may include a touch screen that functions as the display screen 217 and/or the keypad 215. The keypad 215 may instead be any device that accepts user input, such as a trackball, mouse, or joystick. The imaging interface device 216 may serve to allow the digital kiosk device 206 to communicate with an imaging device. Alternatively, an imaging device may be directly incorporated into the digital kiosk device 206. Speakers 214 may be any audio output device. The printer 213 may be used to provide the user a receipt, point-of-sale information (e.g., product information, order confirmation, etc.), coupon, advertisement, or other information to be taken with the user, and scanner 213 may be used to scan a QR Code or barcode identifying a user or transaction, transfer request, user identification card, coupon, or the like. In some embodiments, a telephone/microphone 212 may be used in conjunction with speakers 214 to interact with the digital kiosk device 206, or a remotely located user (e.g., counterpart user in a transaction, customer representative, etc.) when performing a transfer or requesting information. Digital kiosk devices 206 may include various different types of digital position systems 219 (or geo-location systems 219), such as a Global Positioning System (GPS) receiver, so that kiosk location data may be collected and returned to data management servers 102 and/or other client devices 106. In some cases, such kiosk location data may be used to determine which content a specific digital kiosk device 206 is permitted to receive (e.g., based on domain/jurisdiction), and also may be used to determine factors such as language, data availability, network availability, product availability, and the like.

Figure 3:
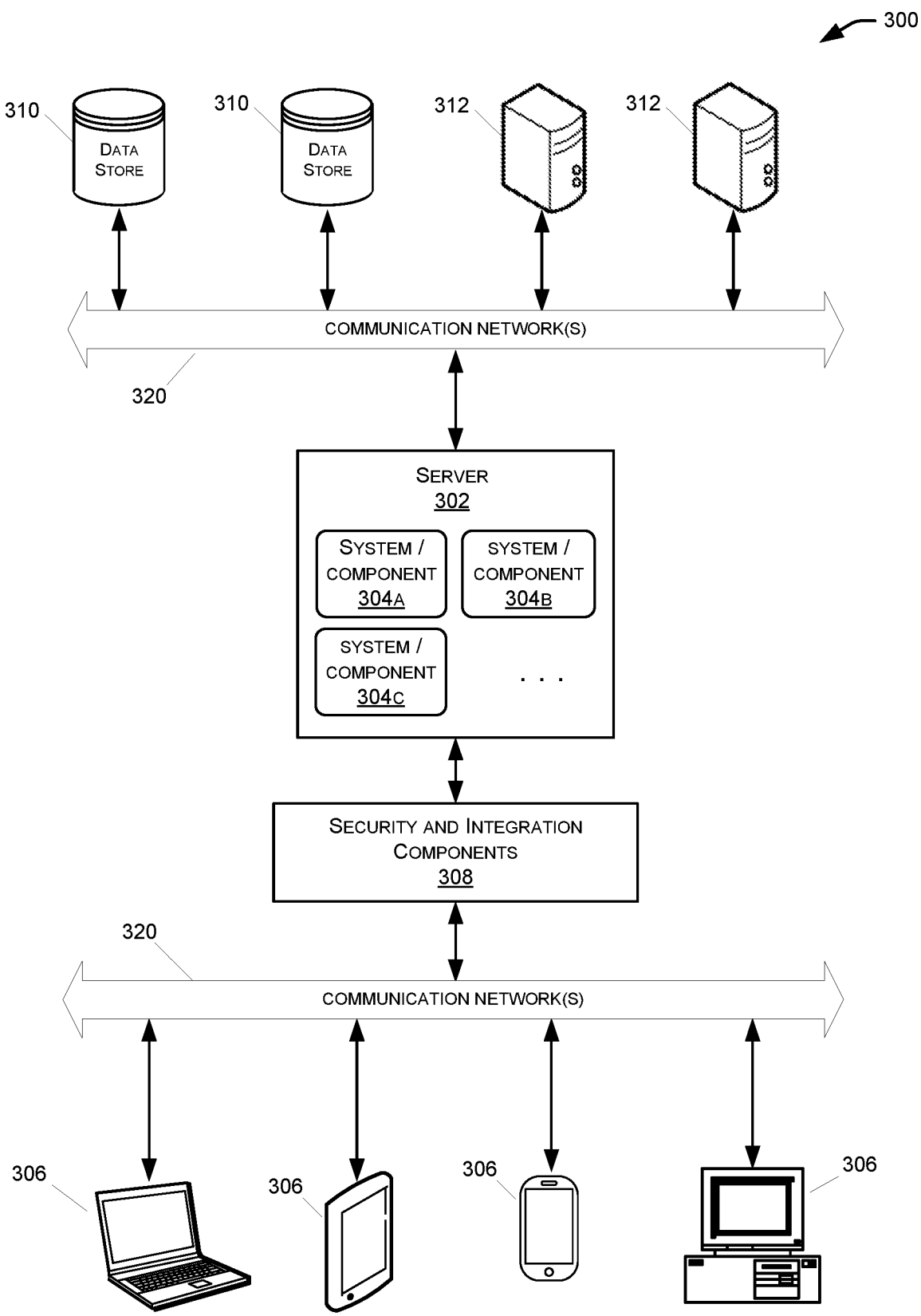
FIG. 3 is a block diagram illustrating a computer server and computing environment within an electronic data transfer network, according to one or more embodiments of the disclosure.

With reference to FIG. 3, an illustrative distributed computing environment 300 is shown including a computer server 302, four client computing devices 306, and other components that may implement certain embodiments and features described herein. In some embodiments, the server 302 may correspond to the data management server 102 discussed above in FIG. 1, and the client computing devices 306 may correspond to the client devices 106 and/or 206. However, the computing environment 300 illustrated in FIG. 3 also may correspond to any other combination of devices and servers configured to implement a client-server model or other distributed computing architecture.

Client devices 306 may be configured to receive and execute client applications over one or more networks 320. Such client applications may be web browser based applications and/or standalone software applications, such as mobile device applications. Server 302 may be communicatively coupled with the client devices 306 via one or more communication networks 220. Client devices 306 may receive client applications from server 302 or from other application providers (e.g., public or private application stores). Server 302 may be configured to run one or more server software applications or services, for example, web-based or cloud-based services, to support content distribution and interaction with client devices 306. Users operating client devices 306 may in turn utilize one or more client applications (e.g., virtual client applications) to interact with server 302 to utilize the services provided by these components.

Various different subsystems and/or components 304 may be implemented on server 302. Users operating the client devices 306 may initiate one or more client applications to use services provided by these subsystems and components. The subsystems and components within the server 302 and client devices 306 may be implemented in hardware, firmware, software, or combinations thereof. Various different system configurations are possible in different distributed computing systems 300 and electronic transfer networks 100. The embodiment shown in FIG. 3 is thus one example of a distributed computing system and is not intended to be limiting.

Although exemplary computing environment 300 is shown with four client computing devices 306, any number of client computing devices may be supported. Such client 306 may include digital kiosk devices including some or all of the features described below in reference to FIG. 2. Other devices, such as specialized sensor devices, etc., may interact with client devices 306 and/or server 302.

As shown in FIG. 3, various security and integration components 308 may be used to send and manage communications between the server 302 and user devices 306 over one or more communication networks 320. The security and integration components 308 may include separate servers, such as web servers and/or authentication servers, and/or specialized networking components, such as firewalls, routers, gateways, load balancers, and the like. In some cases, the security and integration components 308 may correspond to a set of dedicated hardware and/or software operating at the same physical location and under the control of same entities as server 302. For example, components 308 may include one or more dedicated web servers and network hardware in a datacenter or a cloud infrastructure. In other examples, the security and integration components 308 may correspond to separate hardware and software components which may be operated at a separate physical location and/or by a separate entity.

Security and integration components 308 may implement various security features for data transmission and storage, such as authenticating users and restricting access to unknown or unauthorized users. In various implementations, security and integration components 308 may provide, for example, a file-based integration scheme or a service-based integration scheme for transmitting data between the various devices in the electronic transfer network 100. Security and integration components 308 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 308 and/or elsewhere within the electronic transfer network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 302 and client devices 306. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 308 may include specialized hardware for providing secure web services. For example, security and integration components 308 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 320 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 320 may be local area networks (LAN), such as one based on Ethernet, Token-Ring and/or the like. Network(s) 320 also may be wide-area networks, such as the Internet. Networks 320 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 320.

Computing environment 300 also may include one or more data stores 310 and/or back-end servers 312. In certain examples, the data stores 310 may correspond to data store server(s) 104 discussed above in FIG. 1, and back-end servers 312 may correspond to the various back-end servers 110-116. Data stores 310 and servers 312 may reside in the same datacenter or may operate at a remote location from server 302. In some cases, one or more data stores 310 may reside on a non-transitory storage medium within the server 302. Other data stores 310 and back-end servers 312 may be remote from server 302 and configured to communicate with server 302 via one or more networks 320. In certain embodiments, data stores 310 and back-end servers 312 may reside in a storage-area network (SAN), or may use a storage-as-a-service (STaaS) architectural model.

Figure 4:
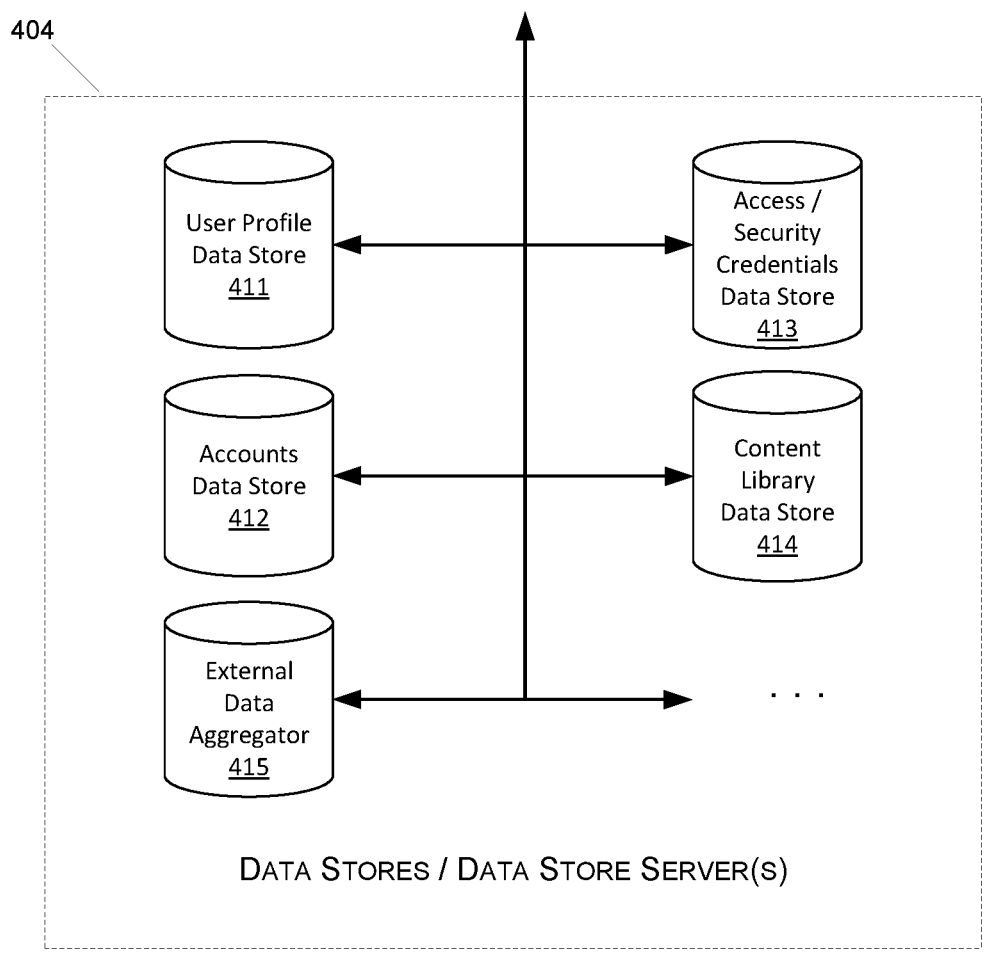
FIG. 4 is a block diagram illustrating an embodiment of one or more data store servers within an electronic data transfer network, according to one or more embodiments of the disclosure.

With reference to FIG. 4, an illustrative set of data stores and/or data store servers is shown, corresponding to the data store servers 104 of the electronic transfer network 100 discussed above in FIG. 1. One or more individual data stores 411-415 may reside in storage on a single computer server 104 (or a single server farm or cluster) under the control of a single entity, or may reside on separate servers operated by different entities and/or at remote locations. In some embodiments, data stores 411-415 may be accessed by the data management server 102 and/or other devices and servers within the network 100 (e.g., client devices 106, external systems 110, administrator servers 116, etc.).

Access to one or more of the data stores 411-415 may be limited or denied based on the processes, user credentials, and/or devices attempting to interact with the data store.

The paragraphs below describe examples of specific data stores that may be implemented within some embodiments of an electronic transfer network 100. It should be understood that the below descriptions of data stores 411-415, including their functionality and types of data stored therein, are illustrative and non-limiting. Data stores server architecture, design, and the execution of specific data stores 411-415 may depend on the context, size, and functional requirements of an electronic transfer network 100. For example, in a secure data transfer systems 100 used for professional training, separate databases or file-based storage systems may be implemented in data store server(s) 104 to store trainee and/or trainer data, training module data and content descriptions, training results, evaluation data, and the like. In contrast, in electronic transfer systems 100 used to provide electronic advertising or other content from content providers to client devices, separate data stores may be implemented in data stores server(s) 104 to store listings of available content and descriptions, content usage statistics, client device profiles, account data, network usage statistics, etc.

A user profile data store 411 may include information relating to the end users within the electronic transfer network 100. This information may include user characteristics such as the user names, access credentials (e.g., logins and passwords), user preferences, and information relating to any previous user interactions within the electronic transfer network 100 (e.g., requested data, provided data, system usage data/statistics, associated users, etc.).

An accounts data store 412 may generate and store account data for different users in various roles within the electronic transfer network 100. For example, accounts may be created in an accounts data store 412 for individual end users, administrator users, and external entities such as businesses, governmental or educational institutions. Account data may include account types, current account status, account characteristics, and any parameters, limits, restrictions associated with the accounts.

A content/security credential data store 413 may include access rights and security information for the electronic transfer network 100 and specific files/content resources. For example, the content/security credential data store 413 may include login information (e.g., user identifiers, logins, passwords, etc.) that can be verified during login attempts by users and/or client devices 106 to the network 100. The content/security credential data store 413 also may be used to store assigned user roles and/or user levels of access. For example, a user's access level may correspond to the sets of data and/or the client or server applications that the user is permitted to access. Certain users and/or client devices may be permitted or denied access to certain applications and resources based on their access level, subscription level, etc. Certain users and/or client devices 106 may have supervisory access over one or more end users accounts and/or other client devices 106, allowing the supervisor to access all or portions of the user's content access, activities, etc. Additionally, certain users and/or client devices 106 may have administrative access over some users and/or some applications in the electronic transfer network 100, allowing such users to add and remove user accounts, modify user access permissions, perform maintenance updates on software and servers, etc.

A content library data store 414 may include information describing the individual data items (or resources) available via the electronic transfer network 100. In some embodiments, the content data store 414 may include metadata, properties, and other characteristics associated with the data items stored in the content server 112. Such data may identify one or more aspects or attributes of the associated data items, for example, subject matter or access level of the content resources, license attributes of the data items (e.g., any limitations and/or restrictions on the licensable use and/or distribution of the data items), price attributes of the data items (e.g., a price and/or price structure for determining a payment amount for use or distribution of the data items), language and geographic associations with the data items, and the like. In some embodiments, the content data store 414 may be configured to allow updating of data item metadata or properties, and to allow the addition and/or removal of information relating to the data items. For example, item relationships may be implemented as graph structures, which may be stored in the content data store 414 or in an additional data store for use by selection algorithms along with the other metadata.

In addition to the illustrative data stores described above, data store server(s) 104 (e.g., database servers, file-based storage servers, etc.) may include one or more external data aggregators 415. External data aggregators 415 may include third-party data sources accessible to the electronic transfer network 100, but not maintained by the electronic transfer network 100. External data aggregators 415 may include any electronic information source relating to the users, data items, or applications of the electronic transfer network 100. For example, external data aggregators 415 may be third-party data stores containing demographic data, education related data, financial data, consumer sales data, health related data, and the like. Illustrative external data aggregators 415 may include, for example, social networking web servers, public records data stores, educational institution servers, business servers, consumer sales data stores, medical record data stores, etc. Data retrieved from various external data aggregators 415 may be used to verify and update user account information, suggest or select user content, and perform user and content evaluations. In some cases, external data aggregators 415 may correspond to external servers/systems 110.

Figure 5:
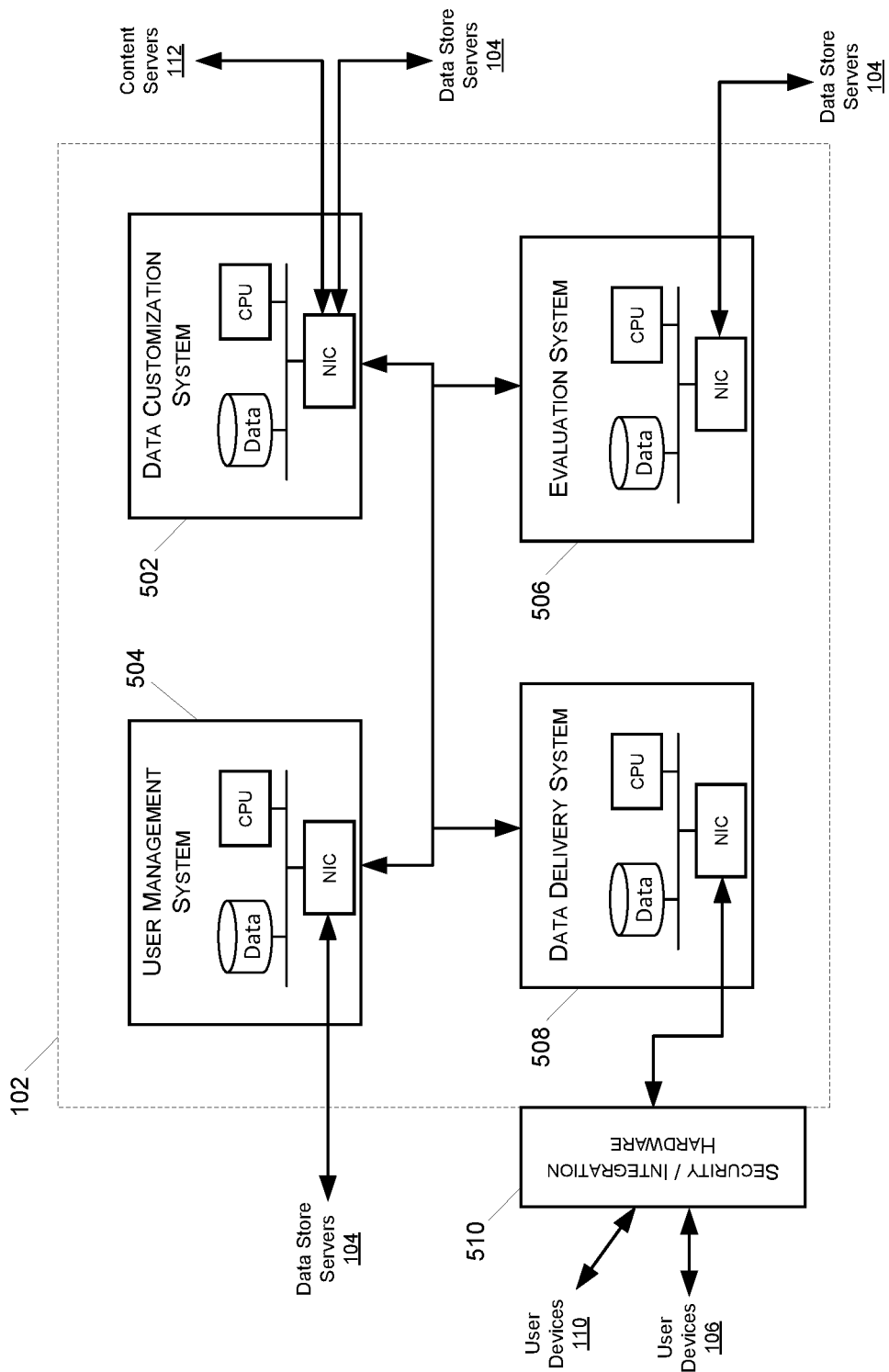
FIG. 5 is a block diagram illustrating an embodiment of one or more content management servers within an electronic data transfer network, according to one or more embodiments of the disclosure.

With reference now to FIG. 5, a block diagram is shown illustrating an embodiment of one or more data management servers 102 within an electronic transfer network 100. As discussed above, data management server(s) 102 may include various server hardware and software components that manage the content resources within the electronic transfer network 100 and provide interactive and adaptive content to users on various client devices 106. For example, data management server(s) 102 may provide instructions to and receive information from the other devices within the electronic transfer network 100, in order to manage and transmit data resources, user data, and server or client applications executing within the network 100.

A data management server 102 may include a data customization system 502. The data customization system 502 may be implemented using dedicated hardware within the electronic transfer network 100 (e.g., a data customization server 502), or using designated hardware and software resources within a shared data management server 102. In some embodiments, the data customization system 502 may adjust the selection and adaptive capabilities of data resources to match the needs and desires of the users and/or client devices 106 receiving the content. For example, the data customization system 502 may query various data stores and servers 104 to retrieve user information, such as user preferences and characteristics (e.g., from a user profile data store 411), location/geographic information associated with users and/or client devices 106, user access restrictions to data recourses (e.g., from an access credential data store 413), previous user activity within the network 100, and the like. Based on the retrieved information from data stores 104 and other data sources, the data customization system 502 may modify content resources for individual users and/or individual client devices 106.

A data management server 102 also may include a user management system 504. The user management system 504 may be implemented using dedicated hardware within the electronic transfer network 100 (e.g., a user management server 504), or using designated hardware and software resources within a shared data management server 102. In some embodiments, the user management system 504 may monitor the activities of users and/or user devices 106 with respect to various data resources. For example, the user management system 504 may query one or more databases and/or data store servers 104 to retrieve user data such as associated data resources, access and completion status, results, and the like.

A data management server 102 also may include an evaluation system 506. The evaluation system 506 may be implemented using dedicated hardware within the electronic transfer network 100 (e.g., an evaluation server 506), or using designated hardware and software resources within a shared data management server 102. The evaluation system 506 may be configured to receive and analyze information from client devices 106. For example, various data received by users via client devices 106 may be compiled and analyzed, and then stored in a data store 104 associated with the user and/or data item. In some embodiments, the evaluation server 506 may analyze the information to determine the effectiveness or appropriateness of data resources with a user or user group, for example, based on subject matter, age group, skill level, or the like. In some embodiments, the evaluation system 506 may provide updates to the data customization system 502 or the user management system 504, with the attributes of one or more data resources or groups of resources within the network 100.

A data management server 102 also may include a data delivery system 508. The data delivery system 508 may be implemented using dedicated hardware within the electronic transfer network 100 (e.g., a data delivery server 508), or using designated hardware and software resources within a shared data management server 102. The data delivery system 508 may receive data from the data customization system 502 and/or from the user management system 504, and transmit the resources to client devices 106. In some embodiments, the data delivery system 508 may determine the appropriate presentation format for the data resources based on the user characteristics and preferences, and/or the device capabilities of client devices 106. If needed, the data delivery system 508 may convert the content resources to the appropriate presentation format and/or compress the content before transmission. In some embodiments, the data delivery system 508 may also determine the appropriate transmission media and communication protocols for transmission of the data to and from client devices 106.

In some embodiments, the data delivery system 508 may include specialized security and integration hardware 510, along with corresponding software components to implement the appropriate security features for data transmission and storage, to provide the supported network and client access models, and to support the performance and scalability requirements of the network 100. The security and integration layer 510 may include some or all of the security and integration components 308 discussed above in FIG. 3, and may control the transmission of data, as well as the receipt of requests and data interactions, to and from the client devices 106, external servers 110, administrative servers 116, and other devices in the network 100.

Figure 6:
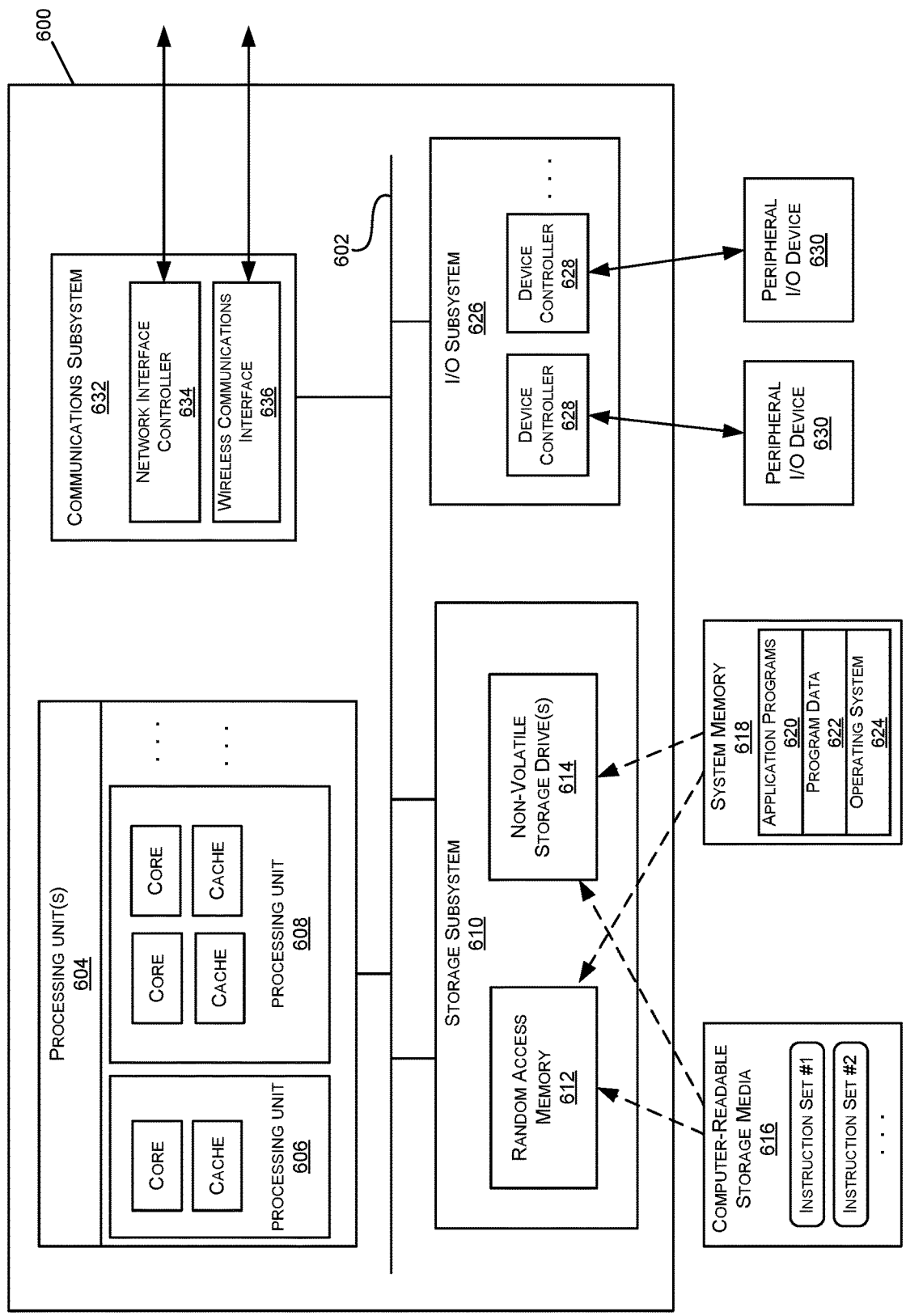
FIG. 6 is a block diagram illustrating the physical and logical components of a special-purpose computing device within an electronic data transfer network, according to one or more embodiments of the disclosure.

With reference now to FIG. 6, a block diagram of an illustrative computer system is shown. The system 600 may correspond to any of the computing devices or servers of the electronic transfer network 100 described above, or any other computing devices described herein. In this example, computer system 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which may be implemented as one or more integrated circuits (e.g., a conventional microprocessor or microcontroller), controls the operation of computer system 600. One or more processors, including single core and/or multicore processors, may be included in processing unit 604. As shown in the figure, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater. As discussed above, in some cases, processing unit 604 may include one or more specialized ASICs designed and configured for cryptocurrency mining and/or specialized cryptographic hardware for handling cryptocurrency transactions.

Processing unit 604 may execute a variety of software processes embodied in program code, and may maintain multiple concurrently executing programs or processes. At any given time, some or all of the program code to be executed can be resident in processor(s) 604 and/or in storage subsystem 610. In some embodiments, computer system 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with the computer system 600 (e.g., integrated audio/video systems, and/or touchscreen displays), or may be separate peripheral devices which are attachable/detachable from the computer system 600.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Computer system 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs.

Depending on the configuration and type of computer system 600, system memory 618 may be stored in volatile memory (such as random access memory (RAM) 612) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the non-volatile storage drives 614. By way of example, and not limitation, system memory 618 may include application programs 620, such as client applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that can further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 616 may include, but is not limited to, Zip® drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 632 may provide a communication interface from computer system 600 and external computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 636, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire® interfaces, USB® interfaces, and the like. Communications subsystem 636 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 632 may be detachable components coupled to the computer system 600 via a computer network, a FireWire® bus, or the like, and/or may be physically integrated onto a motherboard of the computer system 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access computer system 600. For example, communications subsystem 632 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 632 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 632 may output such structured and/or unstructured data feeds, event streams, event updates, and the like to one or more data stores 104 that may be in communication with one or more streaming data source computers coupled to computer system 600.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 7:
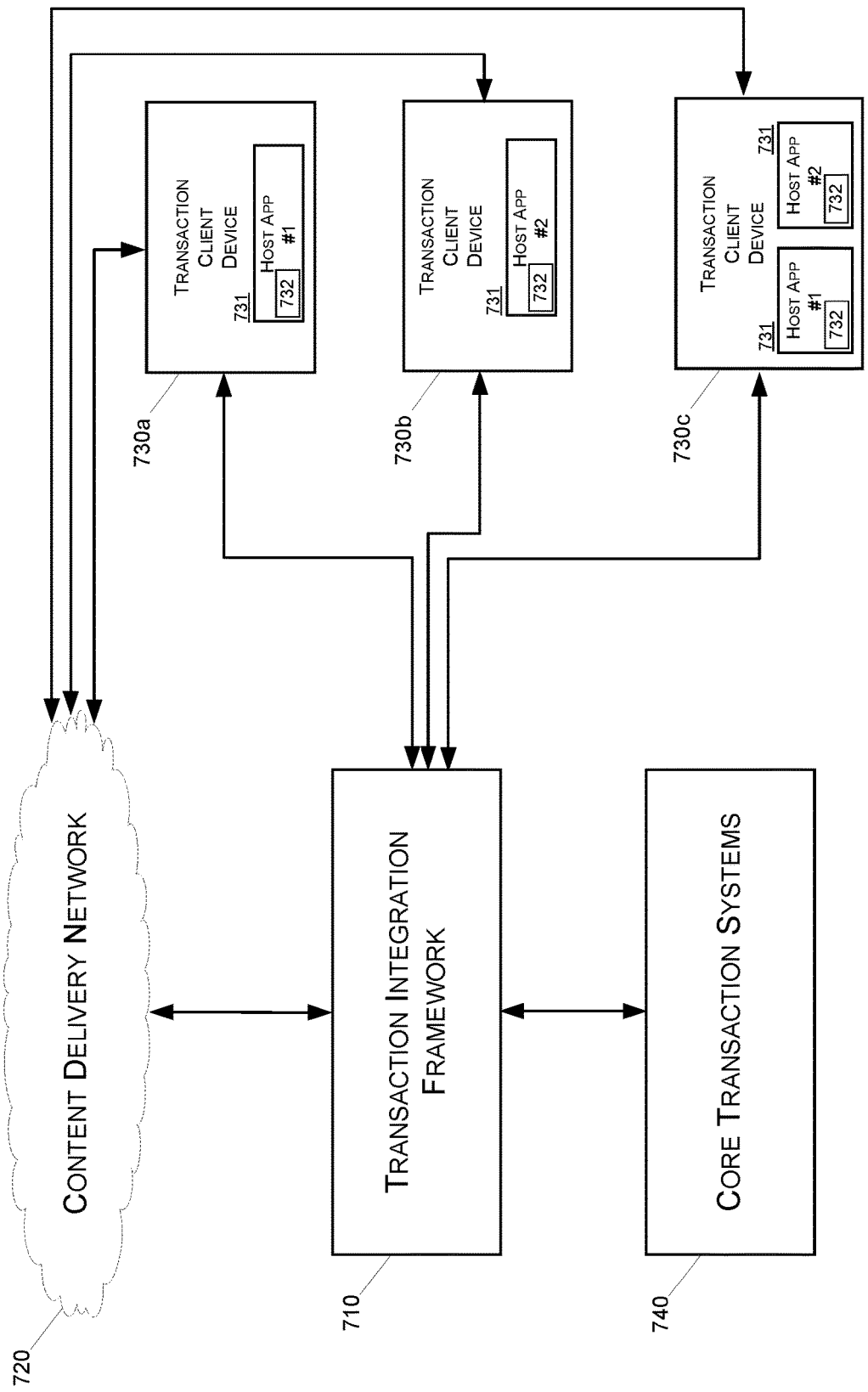
FIG. 7 is a block diagram illustrating an example system including a transaction integration framework, core transaction system, content delivery network, and a plurality of transaction client devices, according to one or more embodiments of the disclosure.

With reference now to FIG. 7, a block diagram is shown illustrating an example integration framework and user interface system 700, which may be configured to provide secure transaction functionality embedded within host applications executing on transaction client devices. In this example, system 700 includes a transaction integration framework 710, a content delivery network 720, a plurality of transaction client devices 730*a*-730*c* (which collectively and/or individually may be referred to as client device(s) 730), and a core transaction system 740. As discussed below in more detail, integration framework 710 and/or client devices 730 may include a number of subsystems (e.g., services, processing engines, servers, applications, etc.) configured to embed secure transaction functionality within host applications 731 executing on transaction client devices. For example, specialized software components 732 (e.g., widgets) may be integrated into and invoked from within host applications 731. These embedded software components 732 may be configured to transmit initial transaction data (e.g., sender and receiver data, location data, host application data, etc.) to the transaction integration framework 710. In response, the transaction integration framework 710 may determine a particular transaction user interface to be embedded within the host application 731, and may provide the particular transaction user interface to the integrated software component 732. From there, the software component 732 may render the transaction user interface within the host application 731, allowing the user to initiate a transaction request that may be securely transmitted to and processed by the transaction integration framework, using core transaction systems 740. Thus, the transaction request may be initiated using the appropriate set of input data received via the particularly selected transaction user interface, which may be sender location and/or receiver location specific, and/or may be partner specific.

Transaction client devices 730 may include any types of computing devices discussed above in connection with user devices 106, 206, 600, etc. For example, one or more transaction client devices 730 may include desktop computers, servers, television set-top boxes, and home gaming systems, while other client devices 730 may include various mobile devices such as laptop computers, tablet computers, smart phones, smart watches, wearable computing devices, and vehicle-based computing systems. Each client device 730 may include some or all of the components of device 600, discussed above. However, it should be understood that these examples of user device architectures are illustrative and non-limiting, and that different configurations of hardware, software, and network components may be used in different user devices.

The host applications 731 executing on the transaction client device 730 may include, for example, messaging applications, social networking application, gaming applications, electronic mail client applications, online merchant client applications, and other types of interactive or collaborative user software applications. In some embodiments, the transactions initiated within the host applications 731 may be funds transfers between current users of the host application 731, such as the transfers between current parties of a messaging conversation, users of a social networking application, users within a collaborative gaming environment, etc. For instance, a user interacting with the host application 731 may select an option within the host application 731 to initiate a payment to or request a payment from a different user via the host application 731. The selection of such an option within the host application 731 may invoke the integrated software component 732, causing the component 732 to retrieve initial transaction data (e.g., sender data, receiver data, location data, transaction type data, host application data, etc.) and transmit the initial transaction data to the integration platform 710.

The content delivery network 720 may be configured to host a plurality of different transaction user interfaces, and to provide specific transaction user interfaces to transaction clients 730 upon request. For example, in some cases, a different transaction user interface may be required for each different permutation of the sender location (e.g., country, state, and/or region) and receiver location (e.g., country, state, and/or region). For instance, each individual country, state, region, or other geographic domain may impose a unique set of a rules with respect to different transaction types (e.g., value transfers) into and out of the jurisdiction. Such rules may be determined as a matter of policy by the jurisdiction, for example, compliance rules, risk assessment rules, etc. For instance, a first jurisdiction (e.g., country) may require that all transfers initiated from the first jurisdiction must require submission and analysis of certain specified sender and receiver information. Similarly, a second jurisdiction (e.g., country) may require that all transfers to recipients within the second jurisdiction may require certain specific user validations and a predetermined question/answer interaction session. In these examples, a transfer from a sender in the first country to a recipient in the second country would therefore require a transaction user interface that satisfied both sets of location-specific rules and requirements (e.g., the sender country outgoing requirements and the receiver country incoming requirements). Thus, if the systems 700 is to support worldwide cross-border transactions (or at least a significant subset of worldwide cross-border transactions), then the system 700 may be required to embed and render within the host applications 731 hundreds or thousands of different transaction user interfaces in different scenarios.

Additionally, in certain embodiments, the transaction integration framework 710 may support partner-specific transaction user interfaces, so that a sender-to-receiver transaction initiated from within a first host application (e.g., Host App #1) may have different rules and restrictions, and may require different user input data and thus a different transaction user interfaces, from the exact same sender-to-receiver transaction initiated from within a second host application (e.g., Host App #2). Thus, the support of partner-specific transaction user interfaces, additionally or alternatively to sender location specific and receiver location specific transaction user interfaces, may have a multiplying effect on the total number of transaction user interfaces that potentially may be embedded and rendered within host applications 731. Moreover, in some cases, different transaction user interfaces may be required based for different transaction types and subtypes (e.g., different payment types and/or different amount ranges in money transfer transactions), which may have a further multiplying effect on the total number of transaction user interfaces that potentially may be embedded and rendered within host applications 731.

Accordingly, as shown in this example, the transaction integration framework 710 may use a content delivery network 720 to host and provide large numbers of different transaction user interfaces. The content delivery network 720 may include a number of geographically dispersed secure storage systems and computer servers configured to host, manage, and update a plurality of transaction user interfaces, and to provide specific transaction user interfaces in response to requests from client devices 730. In such examples, an authoring system 900 for transaction user interfaces associated with the integration framework 710 may be implemented to allow users to generate new transaction user interfaces for new sender location-receiver location (and/or host application) permutations, and/or to update existing permutations of transaction user interfaces based on different rules and data requirements imposed by sender jurisdictions, receiver jurisdictions, and/or host application developers, etc. In some cases, each separate host application 731 (and/or each partner host application developer) may have a different associated folder structure, etc., within the content delivery network 720. After the transaction user interfaces are generated (or updated) via the authoring system 900, the integration framework 710 may transmit the interfaces to the content delivery network 720. In some cases, the interfaces may be stored as JSON files, and multiple versions of each interface may be generated and stored in different languages.

When a user on a transaction client device 730 initiates a transaction via a host application, for example, by indicating that the user wants to perform transaction and/or providing initial transaction sender and/or receiver data, the software component 732 integrated into the host application 731 may transmit the indication and/or the initial transaction data to the integration framework 710. As discussed below in more detail, the integration framework 710 may determine sender and receiver locations and/or other factors (e.g., host/partner identity, transaction type, etc.), and may use the location data and other factors to determine the appropriate transaction user interface that should be rendered to the user via the host application 731. The appropriate transaction user interface may correspond to the sender location-receiver location permutation, and/or may comply with the other relevant factors, and thus may be include the necessary user interface fields and interactive components necessary to satisfy the sender, receiver, and host application rules and requirements. After determining the appropriate transaction user interface, the integration framework 710 may determine a particular server within the CDN 720 that is capable of providing the transaction user interface to the client device 730. In some cases, the integration framework 710 may select the particular CDN server based on geographic proximity to the client device 730. Additionally or alternatively, the integration framework 710 may select the particular CDN server based on factors such as current CDN server load, the version and/or recency of the transaction user interface on the particular CDN server, etc. After determining a particular CDN server appropriate to provide the transaction user interface to the client device 730, the integration framework 710 may transmit data identifying the CDN server and the transaction user interface (e.g., a URL hosted by the CDN server) to the integrated application 732 on the client device 730.

In order to perform these features and the additional functionality describes herein, the transaction integration framework 710 may be implemented on a single computer server or multiple different servers in collaboration, operating at one or more data centers/physical locations. An example architecture and component diagram of the transaction integration framework 710 is discussed below in reference to FIG. 8. Additionally, although the physical network components have not been shown in FIG. 7 so as not to obscure the other elements depicted, it should be understood that any of the network hardware components and network architecture designs may be implemented in various embodiments to support communication between the servers and devices in the system 700. Additionally, different client devices 730 and CDN servers within the CDN 720 may use different networks and networks types to communicate with each other and/or with the transaction integration framework 710, including one or more telecommunications networks, cable networks, satellite networks, cellular networks and other wireless networks, and computer-based IP networks, and the like. Further, certain components within system 700 may include special purpose hardware devices and/or special purpose software, such as those included in I/O subsystems systems, positioning systems, and storage and networking capabilities of the various client devices 710, as well as those within the processing engines, subcomponents, and data stores of the integration platform 710.

Further, in some embodiments, the integration framework and user interface system 700 may be integrated within, or configured to operate in collaboration with, one or more electronic data transfer networks 100. For example, system 700 may be the same as, or may operate within or in collaboration with, any of the electronic data transfer network 100 described above. Thus, specific examples of systems 700 may include, without limitation, secure systems for transferring value and other media of exchange, eCommerce systems, multi-entity systems for exchanging content resources (e.g., media files, educational and professional training content, gaming content, Internet content, etc.), and other electronic data transfer systems. In such cases, the transaction integration framework 710 and its associated components, subsystems, and data stores may correspond to and may be implemented within a data management server 102 and/or a data store server 104, and transaction client devices 730 may correspond to the client devices 106 and/or external systems described above in reference to network 100.

Figure 8:
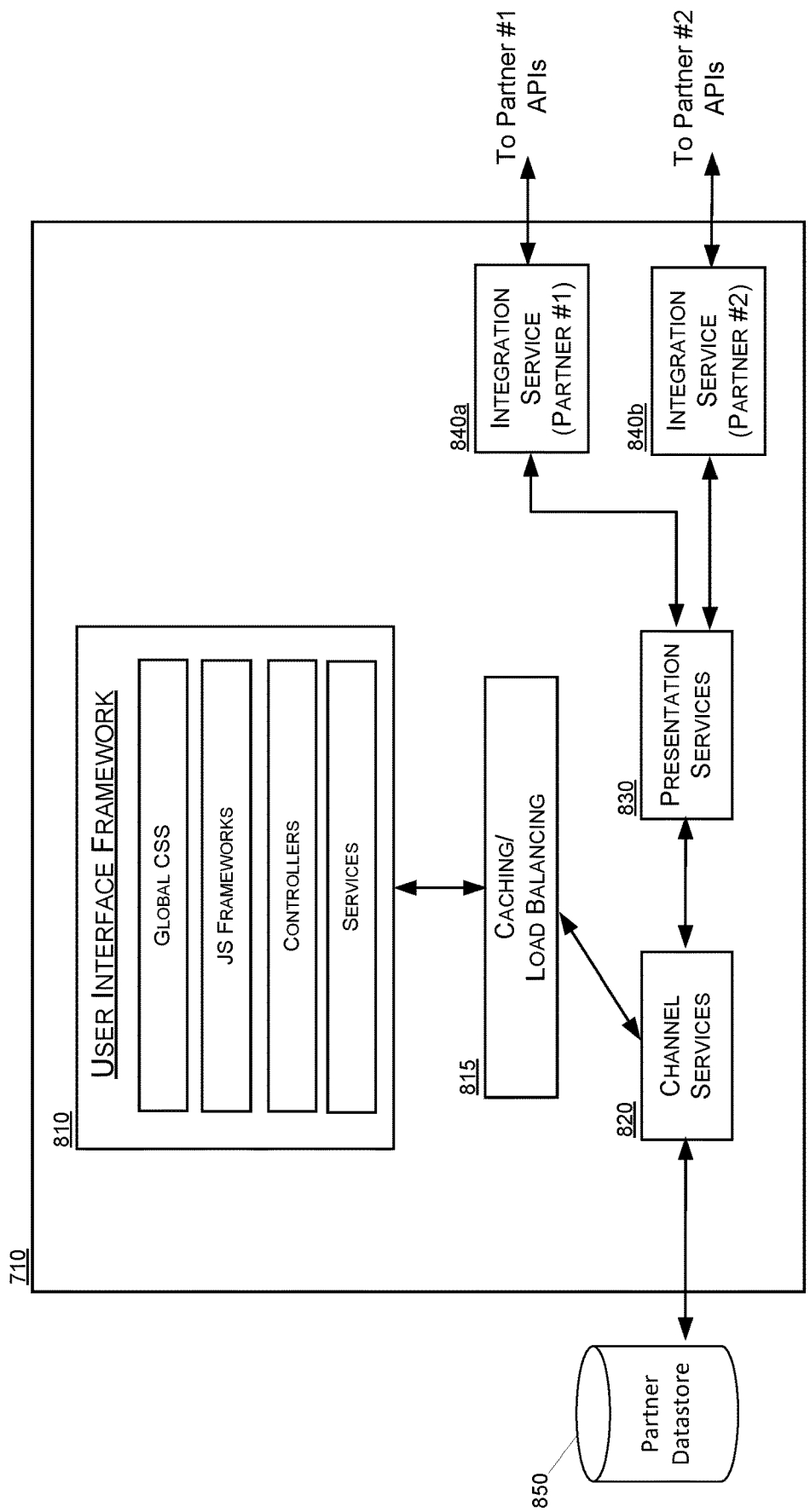
FIG. 8 is a block diagram illustrating an example system architecture and components of a transaction integration framework, according to one or more embodiments of the disclosure.

Referring now to FIG. 8, an illustrative system architecture diagram is shown for the transaction integration framework 710, in accordance with certain embodiments. In this example, the transaction integration framework 710 includes a user interface framework 810, a caching and load balancing system 815, channel services 820, presentation servers 830, and number of partner-specific integration services 840a-840b configured to communicate with host applications 731 via corresponding partner application programming interfaces (APIs).

The user interface framework 810 includes a global CSS component, JavaScript frameworks, controllers, and services, which in collaboration are configured to create the location-specific and/or partner-specific (or host application-specific) transaction user interfaces. In some embodiments, the user interface framework 810 may implement a model and view object, using the JavaScript framework, to allow different user interfaces to be rendered for specific customers and/or languages.

The caching and load balancing system 815 may provide caching on the server 710. Channel services 820 and presentation servers 830 may implement the partner-specific APIs that manage the partner-specific information, such as host application data, rules, regulations, and integration data particular to a specific partner. As used herein, the "partner" may include one or more entities associated with particular host applications 731, such as the application developer or operating entity. In some cases, multiple different host applications 731 may be associated with a single partner having a common set of partner-specific user interface rules, integration protocols, etc.

In some embodiments, a single instance of the channel services 820 and presentation servers 830 may be executed. For example, a unique partner identifier may be passed to the APIs of the channel services 820 and presentation servers 830, and these APIs may return partner-specific data (e.g., partner information, rules, etc.) stored in the partner data store 850, which may be used to render the partner-specific user interfaces. In contrast, the integration services 840 may be partner-specific, so that each integration service 840a or 840b is configured separately to invoke the APIs of a specific partner only. Because different integration services 840 are directed to different endpoints, a different instance may be executed for each integration service in some embodiments.

As noted above, the partner data store 850 may include various partner-specific information, such as profile data, transaction data, etc.

In further reference to FIG. 8, in some implementations, one or more mobile websites of transfer services providers may be developed specifically to be accessed via end user applications 731, such as social networking applications, messaging applications, and the like. In some cases, a mobile website (e.g., HTML 5) may be built to be accessed via a link in an official account of a transfer services provider (e.g., integration framework 710), via an end user application 731. The solution 732 may be hosted and managed by the transfer services provider. The mobile website 732 interfaced to the end user application 731 may be designed using the modern HTML5 stack. Such embodiments may include several potential technical advantages, including with respect to screen design (e.g., support for creating and arranging the user interface 732, the look and the behavior of application content), view management (e.g., structuring and managing the view machinery such as the layout and interactivity of screen elements), data and code management (e.g., updating the screen when the data changes, and updating data when receiving input from the user), and communicating with the back-end and server-side.

As noted above, in some embodiments, the user interface framework 810 may leverage the modern Model-View-Controller (MVC) architectural pattern for writing the application for the transfer services provider. This proposed application may divide the user interface into three distinct parts, helping to organize the codebase into logical representations of information depending upon their function. One goal of MVC in such solutions may be to clearly define the responsibilities of each piece of the application. Because every class (e.g., every file) has clearly defined responsibilities, they may implicitly become ignorant of the larger environment—making the application easier to test, easier to maintain, and allowing code to be reused. Additionally, the such solutions may be designed on via the integration platform 710 and may leverage the design principals of one or more web content management systems (e.g., the CQ5 platform architecture) for the extended transfer services via the messaging, social networking or other host application 731. Such solutions may provide the access to the functionality of transaction integration platform 710 (e.g., to initiate and request transfers and other transactions) within the native messaging application 731 or other host application 731.

In some cases, changes may be performed via the channel services 820. For example, in certain implementations, as transaction user interface flows and designs are changed, the user interface screens cannot be reused. In such embodiments, separate development and no reuse of existing front code development altogether may be enforced. However, in some embodiments, certain existing JavaScript libraries (e.g., Client API and validations) may be reused. Further, in some cases, the application may support only phone form factors. For instance, the responsive web page design may serve all IOS and ANDROID mobile devices, along with form and factors.

In various embodiments and implementations, specific technical design principles and specifications may be used, such as using a single code based for all platforms, and reusing an R3 platform/architecture. Additionally, in some embodiments, the transaction data may be secured within the integrated software component 732, and communications between the software component 732 and the integration framework 710 may be secured, so that it is not accessible by the social networking/messaging application.

Additionally, certain embodiments may support seamless integration between the integrated component 732 and social networking applications, messaging applications, and other host applications 731, to provide a better user experience. For example, a mobile communication host application 731 may initially invoke an integrated mobile application 732, passing a unique one time use code in a query parameter to the callback URL. Next, the integrated mobile application 732 may call the appropriate integration service 840 via HTTPS/REST/POST, passing the one-time code. The integration service 840 then may call an API within the channel services 820 and/or presentation services 830 via HTTPS/REST/GET, passing the one-time code, the Application ID, and a "secret." The API may validate the information and return a multi-use access token which is valid for a only predetermined period of time (e.g., five minutes). The integration service 840 then may call an API using the access token and Application ID, where the API returns information corresponding to the user of the host application 731, such as the openID, nickname, and a URL of the user's associated avatar image. This user information then may be returned to the integrated mobile site 732 via the integration service 840.

Figure 9:
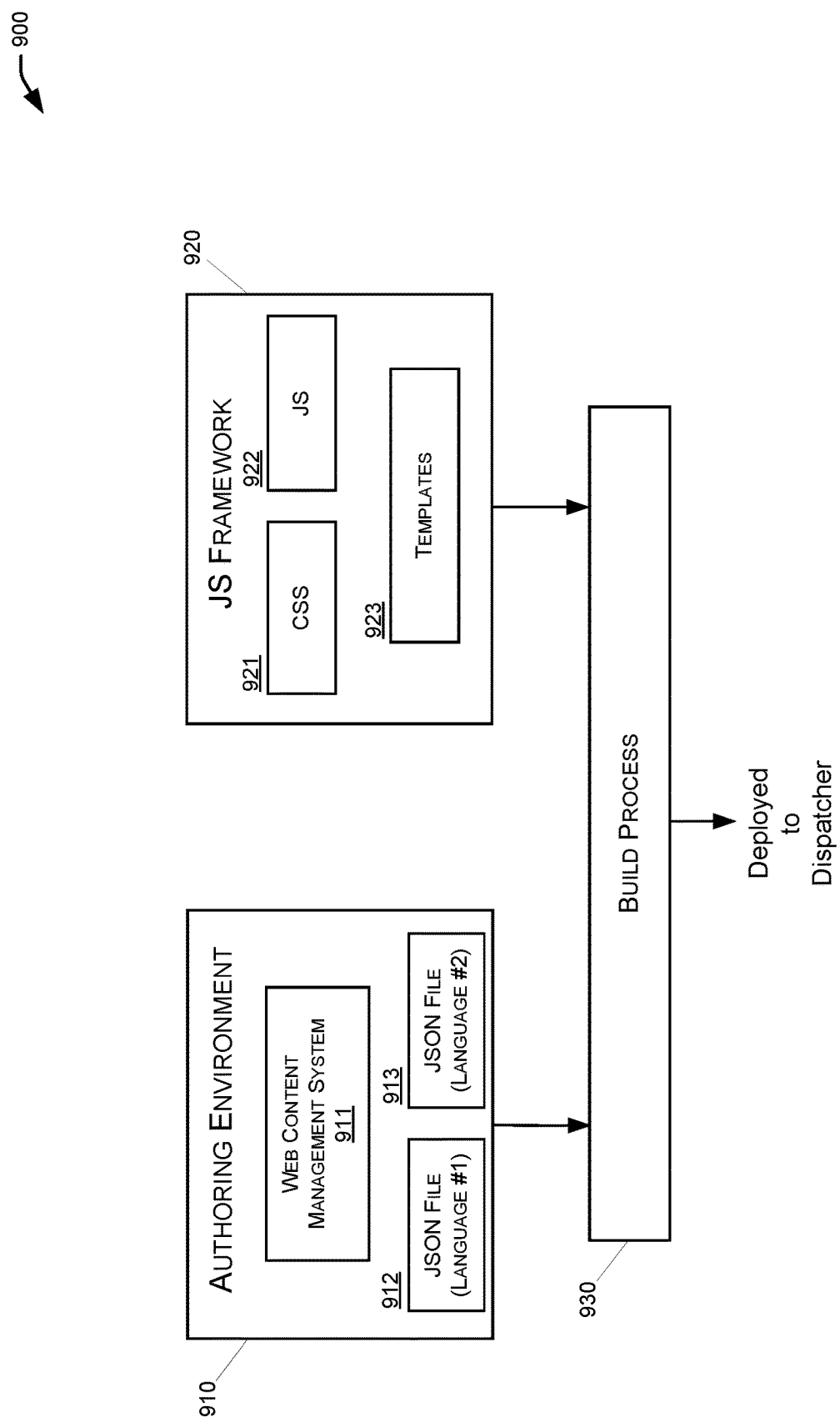
FIG. 9 is a block diagram illustrating an example architecture of a transaction user interface authoring system, according to one or more embodiments of the disclosure.

Referring now to FIG. 9, an illustrative system architecture diagram is shown for an authoring environment 900, in accordance with certain embodiments. The authoring environment 900 in this example may be used to generate and/or modify particular transaction user interfaces via the integration framework 710. In some implementations, the authoring environment 900 may correspond to, or may operate separately but in collaboration with, the user interface framework 810.

In this example, authoring environment 910 includes web content management system 911, and two JSON files 912-913 corresponding to a transaction user interface rendered in two different languages, an English JSON file 912 and a Spanish JSON file 913. Additionally, the JavaScript framework 920 includes a cascading style sheet (CSS) component 921 that may be used to provide a theme the transaction user interface. In some cases, the CSS 921 may apply a generic style guide to all transaction user interfaces, while additionally or alternatively, each transaction user interface may have its own associated stylesheet. The JavaScript component 922 may be configured to generate a JavaScript widget that may be wrapped by a publisher, and these build components 921-922 along with templates 923 may be leveraged during the build process 930 to support rapid content changes to existing user interfaces.

Figure 10:
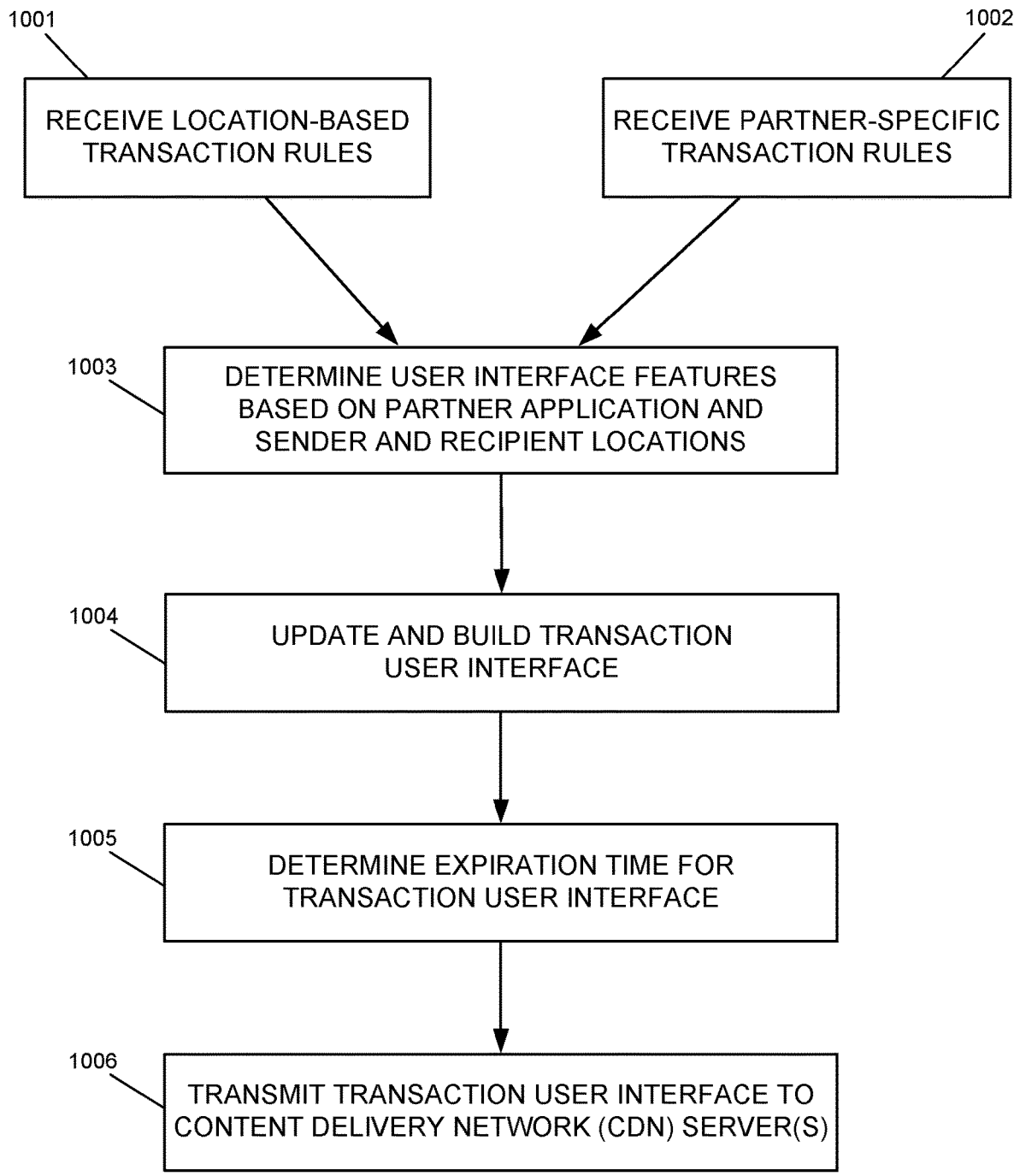
FIG. 10 is a flow diagram illustrating an example process of generating and hosting a plurality of transaction user interfaces, according to one or more embodiments of the disclosure.

Referring now to FIG. 10, a flow diagram is shown illustrating an example process of generating and hosting a plurality of transaction user interfaces. As described below, the steps in this process may be performed by one or more components in the systems described above (e.g., system 700), such as a transaction integration framework 710 in communication with one or more a content delivery network 720 and client devices 730. However, it should be understood that the various features and processes described herein, including designing and building transaction user interfaces, and hosting the transaction user interfaces (e.g., via a standalone data store or a CDN), need not be limited to the specific systems and hardware implementations described above in FIGS. 1-9.

In steps 1001 and 1002, various systems/components within the transaction integration framework 710 may receive location-based rules (step 1001) and/or partner-specific rules (step 1002) to be applied to secure transactions supported by the framework 710. For example, as discussed above, individual jurisdictions (e.g., countries, states, and/or regions) may have requirements for certain transaction types initiated within their jurisdictions and/or directed to their jurisdictions. For example, a first jurisdiction may require specific user identification data, recipient data, transaction data, etc., while a second jurisdiction may have different requirements for initiating the same transaction. Different jurisdictions also may have different requirements with respect to user notifications (e.g., legal disclaimers), authentication and identity verification techniques, etc. Moreover, a jurisdiction's requirements for a transaction initiated/sent from the jurisdiction may be different from the requirements for a transaction received in the jurisdiction.

In addition to the location-based rules received in step 1001, a number of partner-specific rules may be received by the integration framework 710 in step 1002. Partner-specific rules may include any rules similar to any of the location-based rules discussed above. However, partner-specific rules are associated with specific partners and/or host applications 731, rather than with specific jurisdictions. For instance, a first partner-specific rule may specify that any transactions initiated via a first host application 731 will require two-factor authentication and a written user explanation for the transaction (to be logged), whereas a second partner-specific rule applicable to a second host application 731 may have entirely different rules/requirements. In addition to these examples, both location-based rules and partner-specific rules may also include rules based on specific transaction type, permissible times for initiating or completing transactions, specific user/role requirements for initiating or completing transactions, transfer amount limits (e.g., in data or funds) for certain transaction types, and/or rules relating to specific resources that may/may not be transferred, etc.

In step 1003, the integration framework 710 may determine the appropriate user interface features/components for the particular combination of the location-based rules and partner-specific rules. Thus, the set of features/components determined in step 1003 may correspond to a single transaction user interface that enforces a set of location-based rules (e.g., sender location rules and receiver location rules) as well as set of partner-specific rules. Depending on the different types of location-based rules, partner-specific rules, and various other rules that may be implemented by the integration framework 710, the user interface components/features determined in step 1003 may include content to be displayed to the user (e.g., notifications), data fields configured to receiver user input, interactive interface components used to verify/authenticate users, etc. These user interface components/features may be individual controls (e.g., dropdowns, text boxes, etc.), or may be entire pages of content. Thus, the resulting transaction user interface may be single page interface, a multi-page interface, or a more complex interactive user application with multiple pages, different navigation paths, interactive controls, etc.

As discussed below, the transaction user interface resulting from the components/features determined in step 1003 may be used in scenarios when the integration framework 710 determines that both these location-based rules and partner-specific rules apply. However, in other scenarios, only the location-based rules may apply (e.g., if the transaction is initiated from a separate host application), or only the partner-specific rules may apply (e.g., if the transaction is initiated from a separate jurisdiction). In other scenarios, neither of these sets of rules may apply, or different sets of rules may apply corresponding to the different sender and receiver locations and/or different partners. Accordingly, the steps in this example flow diagram may be performed separately for each different permutation of the possible sender locations and receiver locations. Further, when partner-specific rules are also supported (and/or any other categories of rules described above), the steps in this example flow diagram may be performed separately for each different permutation of all of the possible values for each variable (e.g., sender location, receiver location, partner, transaction type, time, etc.).

In step 1004, a transaction user interface is built (or updated from a previous version) to incorporate the user interface components and features determined in step 1003. Various different techniques may be used to build and/or update the user interface in step 1004, and different formats of user interface may be used in different embodiments. For example, in some cases, the user interface framework 810 and/or authoring environment system 900, described above, may be used to build the user interface in step 1004. However, other build techniques and/or different user interface format may be used in other examples. In some cases, the step 1004 may include the generation of multiple different user interface data objects or files corresponding to different languages. In certain cases, the languages designated for the user interface(s) created in step 1004 may be determined based on the sender location and/or receiver location associated with the location-based rules received in step 1001. For instance, when a set of location-based rules is received governing transfers from the United States to China, the integration platform 710 may determine that a transaction user interface should be generated in English, Spanish, and Chinese, whereas when a set of location-based rules is received governing transfers from China to France, the integration platform 710 may determine that a transaction user interface need not be generated in English or Spanish.

In step 1005, the integration platform 710 may determine an expiration time/date associated with the transaction user interface generated in step 1004. As discussed below, the expiration time may be enforced by the content delivery network 720 to ensure that expired and stale versions of particular transaction user interfaces will not be provided to client devices 730. In some embodiments, an expiration time for the transaction user interface (e.g., one hour, one day, one month, etc.) may be assigned by default in some embodiments. In other cases, the expiration times for transaction user interfaces may be determined based on input received from the associated jurisdictions of the sender and receiver locations, or based on data received from the host application 731. For example, for application security and data integrity reasons, a jurisdiction or a partner may desire a shorter expiration time, whereas in other example, for application performance reasons, the jurisdiction or partner may desire a longer expiration time.

In step 1006, the transaction user interface generated in step 1004 is provided to one or more CDNs 720, along with the associated expiration time/date determined in step 1005. As noted above, CDN 720 may include a network of geographically dispersed secure storage systems and computer servers configured to host, manage, and update transaction user interfaces. Transmitting the transaction user interface to the CDN 720 may result in the user interface file and/or data objects being stored and replicated on multiple different data centers within the CDN 720.

Figure 11:
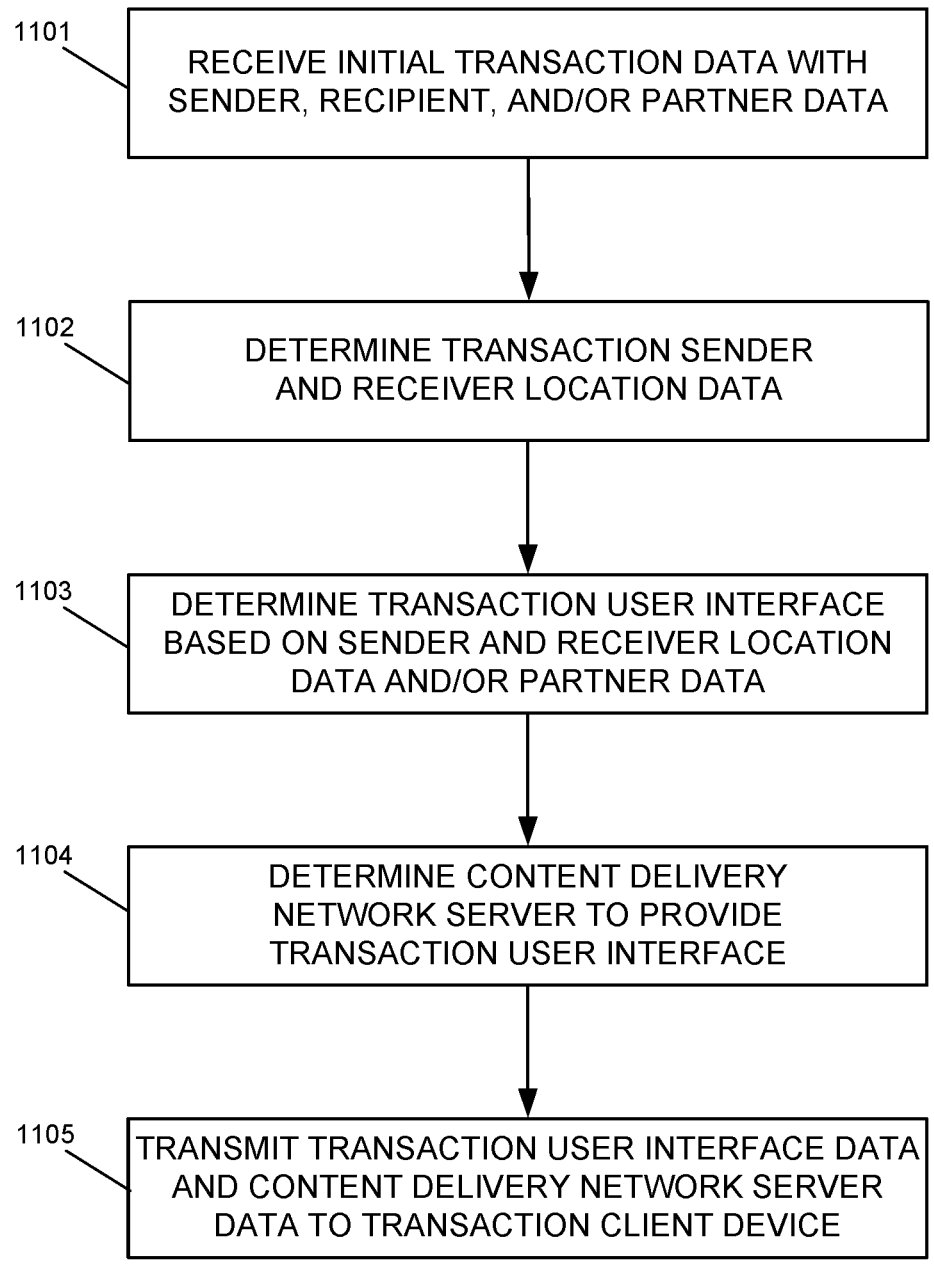
FIG. 11 is a flow diagram illustrating an example process of determining and providing a particular transaction user interface to a client device, according to one or more embodiments of the disclosure.

Referring now to FIG. 11, a flow diagram is shown illustrating an example process of determining and providing a particular transaction user interface to a client device, in response to the initiation of a transaction by a user. As described below, the steps in this process may be performed by one or more components in the systems described above (e.g., system 700), such as a transaction integration framework 710 in communication with one or more a content delivery network 720 and client devices 730. However, it should be understood that the various features and processes described herein, including determining a particular transaction user interface and a particular CDN server, need not be limited to the specific systems and hardware implementations described above in FIGS. 1-9.

In step 1101, the integration framework 710 may receive a transmission of initial transaction data from an integrated software component 732 executing on a client device 730. As discussed above, the integrated software component 732 may be associated with (and/or executed within) an end user host application 731, such as a messaging application 731, a social networking application 731, a gaming application 731, etc. The host applications 731 in these examples may be configured to support one or more types of transactions (e.g., secure data transfers, funds transfers, etc.) by invoking the integrated software component 732 in response to an indication from the user that the user would like to perform a transaction. For instance, in an embodiment where secure, cross-border, user-to-user funds transfers are supported by a host application 731, the host application 731 may provide a user-selectable component (e.g., a clickable button or icon) that causes the integrated software component 732 to be invoked.

When the host application 731 invokes the integrated software component 732, it may pass the integrated software component 732 various initial transaction information, including data identifying the sender in the transaction (e.g., which may be assumed to be the current user of the host application 731), and/or data identifying the receiver in the transaction (e.g., which may be assumed to be the user that the current user is interacting with in the host application 731 at the time the integrated software component 732 is first invoked). Depending on the information available to the host application, the sender and receiver data may include, for example, user identifiers, email addresses, names, phone numbers, etc. In some cases, the host application 731 might not be configured to or able to determine the intended sender and/or intended recipient(s) for a transaction, and thus may render an initial generic user interface to receive input from the user regarding the sender and receiver of the proposed transaction. Additionally, in some embodiments, the host application 731 may provide the integrated software component 732 with additional data beyond sender and receiver identifying data, such as the type of transaction to be initiated (e.g., based on the particular user-selectable component selected by the user, when multiple components and transaction types are available), data identifying the host application (or partner), the current location data of the mobile client device 730, the current network and IP address of the mobile client device 730, and/or other application session data, etc.

In some embodiments, the integrated software component 732 may receive a unique identifier associated with the current user of the host application 731, and may transmit the unique identifier to the integration platform to perform a single-sign-on for the user, seamlessly and without any additional input required from the user.

In step 1102, the integration framework 710 may determine the locations associated with the sender and receiver in the transaction, based on the data received from the integrated software component 732 in step 1101. In some cases, the integrated software component 732 may itself determine the sender location (e.g., based on the location of the client device 730) and/or the recipient location (e.g., based on user data of the host application 731). In other cases, the integration framework 710 may retrieve the sender and receiver locations from a data store (e.g., 850) data based on email addresses, names, phone numbers, IP addresses, or the other data provided by the integrated software component 732.

In some embodiments, the locations determined (or received) in step 1102 may correspond to the current locations of the transaction sender and receiver, while in other cases the locations may correspond to the current locations of the resources being transferred. For example, a user currently in Country A may initiate a funds transfer from an account at a financial institution in Country B, or a transfer of secure data files from a data center in Country B. In these case, the applicable transaction compliance rules may be those of Country B, and thus the integration framework 710 would identify the country of the resources to be transferred, not the current country of the user. However, in other cases, the current physical jurisdiction of the user also may invoke certain location-based sender rules, instead of or in addition to the location-based sender rules associated with the jurisdiction of the resources to be transferred. Similar techniques may be performed to determine the relevant recipient location(s).

Although this example relates to sender and receiver location data only, in other examples, the integration framework 710 may identify additional data in step 1102 that may be relevant for determining the transaction user interface. For instance, as discussed above, the particular partner and/or host application 731 may have partner-specific and/or host application-specific rules or requirements for the transaction that may affect which transaction user interface should be selected. Additional rules or requirements for the transaction also may be associated with specific times, transaction types, transfer amounts, and/or other transaction information. Thus, in such cases, the integration framework 710 may determine this additional data in step 1102.

Further, although this example is discussed with reference to a single sender and a single receiver, the integration framework 710 may support one-to-many, many-to-one, and many-to-many transactions as well. For such transactions, the integration framework 710 may determine the location data, amount data, and/or other relevant transaction data, for all senders and receivers, so that the user interface(s) selected or generated for the these transactions complies with all applicable location-based rules from all of the various sender and receiver jurisdictions.

In step 1103, the integration framework 710 may determine a particular user interface that should be used for submitting transaction requests, based on the sender and receiver location data (and any other relevant data) determined in step 1102. As discussed above, a different transaction user interface may be required for each different permutation of sender locations and receiver locations. Additionally, in some cases, particular partners, host applications, and other transaction data determined in step 1102 also may be factors in determining the transaction user interface(s) to be used.

In step 1104, the integration framework 710 may determine a server within the content delivery network 720 to serve the particular transaction user interface to the client device 730. When the particular transaction user interface is stored on multiple different servers within the CDN 720, the integration framework 710 may use one or more criteria for selecting a particular CDN server. For example, when multiple CDN servers that host the particular transaction user interface are geographically dispersed, the integration framework 710 may select the CDN server that is closest geographically to the client device 730 to serve the transaction user interface. In other examples, the integration framework 710 may select a CDN server from a plurality of CDN servers based on the current processing and/or network capacities of the CDN servers. In still other examples, the particular version, timestamp, and/or recency of the particular transaction user interface may be used to select a CDN server to serve the transaction user interface. Any combination and various different weightings of the above factors may be used to select the particular server of the CDN 720 in step 1104.

In step 1105, the integration server 710 may transmit data identifying the particular transaction user interface, and the CDN server selected to serve the transaction user interface, to the client device 730. In some embodiments, the integration server 710 may construct and transmit a Uniform Resource Locator (URL) to the integrated software component 732. The URL may be constructed using a domain name corresponding to the selected CDN server and a filename corresponding to the address of the particular transaction user interface at that CDN server, in order to direct the client device 730 to the appropriate user interface files.

Figure 12:
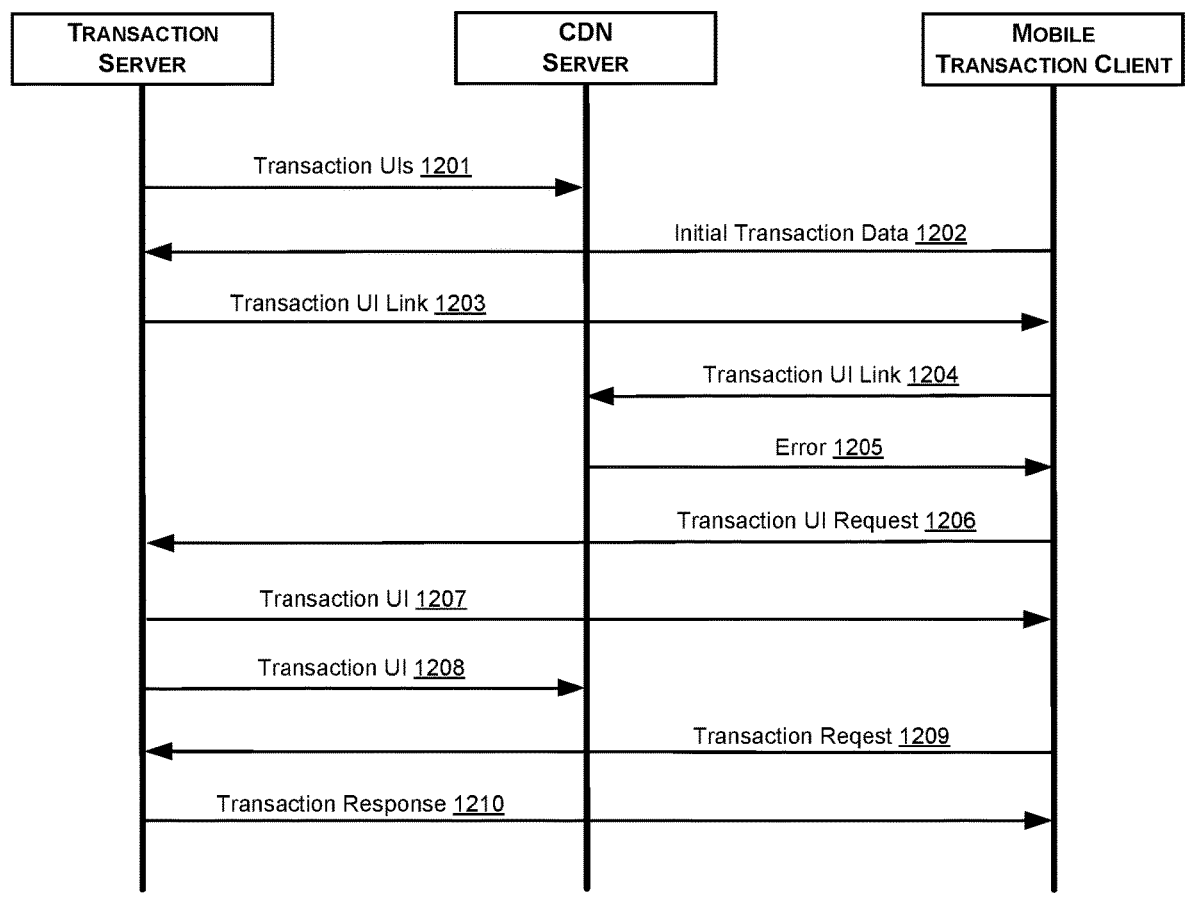
FIG. 12 is an example swim lane diagram illustrating an example process of hosting transaction user interfaces, providing particular transaction user interfaces to client devices, and supporting transaction requests initiated using the particular transaction user interfaces, according to one or more embodiments of the disclosure.

Referring now to FIG. 12, a swim lane diagram is shown illustrating an example process of hosting transaction user interfaces, providing particular transaction user interfaces to client devices, and supporting transaction requests initiated using the particular transaction user interfaces. As shown in the figure, the steps in this process may be performed by one or more components in the systems described above (e.g., system 700), such as a transaction integration framework 710 in communication with a server of a content delivery network 720, and a mobile transaction client device 730. However, it should be understood that the various features and processes described herein, including determining a particular transaction user interface and a particular CDN server, need not be limited to the specific systems and hardware implementations described above in FIGS. 1-9.

In step 1201, the integration framework 710 transmits one or more transaction user interfaces to the CDN server for storage. Step 1201 may be similar or identical to step 1006 discussed above.

In step 1202, the integration framework 710 receives initial transaction data from a mobile transaction client 730, indicating that the integrated component 732 for performing secure transactions has been invoked via the host application 731. In step 1203, the integration framework 710 responds with a link to a particular transaction user interface hosted by the CDN server, where the integration framework 710 has selected the particular transaction user interface based on the initial transaction data received from the mobile client device 730 (e.g., sender and receiver identity data, location data, partner data, etc.). In step 1204, the mobile client device 730 uses the link to attempt to retrieve the particular transaction user interface from the CDN server. Thus, steps 1202-1204 may be similar to steps 1101-1105 discussed above.

However, in step 1205, rather than the CDN server returning the transaction user interface to the mobile client 730, the CDN server returns an error. In some embodiments, the CDN server may return an error if the version of a requested transaction user interface has expired, or if the CDN server has learned that there is an updated version of the transaction user interface. In other examples, the error in step 1205 may be returned due to the unavailability of resources at the CDN server, a network failure, corrupt file, etc. Therefore, in step 1206, the mobile client 730 may request the transaction user interface directly from the integration framework 710, in response to receiving the error from the CDN server. In other examples, the mobile client 730 may request the transaction user interface from a different CDN server, or may request an updated link from the integration framework 710. However, in this example, the mobile client 730 requests the transaction user interface file(s) directly from the integration framework 710. In step 1207, the integration framework 710 responds by regenerating (if necessary) and then transmitting the updated version of the transaction user interface directly to the mobile client 730. In step 1208, the integration framework 710 also transmits the updated version of the transaction user interface to the CDN server.

After the mobile client 730, and specifically the integrated software component 732, receives the particular transaction user interface, the integrated component 732 may render the transaction user interface within the host application 731. As discussed above, even though the transaction user interface may be rendered by the integrated software component 732, rather than by the host application 731 itself, the transaction user interface may still be rendered in the same user-specific look and feel. For instance, either when receiving the initial transaction data, or at a later time before rendering the interface, the integrated software component 732 may receive from the host application 731 certain user-specific look and feel information, such as the user's preferred background color and theme, the user's screen name, and a URL to the user's avatar within the host application 731, etc. Using this information, the integrated software component 732 may render the transaction user interface to mimic the user's specific look and feel when interacting with the host application 731.

The user then may complete the particular transaction user interface, which has been rendered by the integrated software component 732 within the host application 731. In step 1209, after the user completes the particular transaction user interface, the integrated software component 732 of the mobile client 730 may construct and transmit a completed transaction request (e.g., all of the information provided by the user into the transaction user interface) to the integration framework 710. In step 1210, the integration framework 710 may receive and process the completed transaction request using the core transaction systems 740, and may transmit a transaction response back to the integrated software component 732 for display to the user via the within the host application 731.

Finally, because transaction request data is received from the user by the integrated software component 732, and the transaction response data is output to the user by the integrated software component 732, rather than by the host application 731 itself, the integrated software component 732 may be configured to protect confidential user data and/or transaction data from the host application 731. For example, in some embodiments, the transaction request and response data transmitted in steps 1209 and 1210 may be completely obscured from the host application 731, thereby allowing secure transactions to be performed from within the host application 731 without exposing secure data to an unsecure host application 731.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

The invention claimed is:

1. A system comprising:
one or more processing devices; and
memory coupled with the one or more processing devices and configured to store instructions that, when executed by the one or more processing devices, cause the one or more processing devices to perform operations comprising:
processing specifications for a first set of rules received from a first system that is remote from the one or more processing devices, the first set of rules to be applied to one or more secure transactions supported by a transaction user interface;
processing transaction sender data and transaction receiver data received from a transaction client device;
using the specifications for the first set of rules, determining a first set of interface components as a function of the first set of rules to create a first transaction user interface;
configuring the first transaction user interface with the first set of interface components as a function of the first set of rules to create the first transaction user interface;
determining a first expiration time associated with the first transaction user interface;
determining a first content delivery network server of a plurality of content delivery options, the plurality of content delivery options comprising a second content delivery network server that is distinct from the first content delivery network server and that is associated with a prior version of the first transaction user interface, where the prior version is not valid according to the first set of rules, and the first transaction user interface is valid according to the first set of rules; and
transmitting data associated with the first transaction user interface to the first content delivery network server to facilitate the first transaction user interface to the transaction client device.

2. The system as recited in claim 1, where the first expiration time associated with the first transaction user interface is determined based at least in part on the specifications for the first set of rules received from the first system that is remote from the one or more processing devices.

3. The system as recited in claim 2, where the transmitting the data associated with the first transaction user interface to the first content delivery network server to facilitate the first transaction user interface to the transaction client device comprises specifying the first expiration time for the first content delivery network server to enforce.

4. The system as recited in claim 3, where, after the first expiration time, the first content delivery network server does not facilitate the first transaction user interface to the transaction client device.

5. The system as recited in claim 4, the operations comprising:
processing specifications for a second set of rules received from a second system that is remote from the one or more processing devices, where the second set of rules is different from the first set of rules, and the second system is different from the first system;
processing second transaction sender data and second transaction receiver data received from a second transaction client device;
using the specifications for the second set of rules, determining a second set of interface components as a function of the second set of rules to create a second transaction user interface, where the second set of interface components is different from the first set of interface components; and
configuring a second transaction user interface with the second set of interface components as a function of the second set of rules to create the second transaction user interface.

6. The system as recited in claim 5, the operations comprising:
determining a second expiration time associated with the second transaction user interface, where second expiration time is different from the first expiration time;
determining a third content delivery network server of the plurality of content delivery options; and
transmitting second data associated with the second transaction user interface to the third content delivery network server to facilitate the second transaction user interface to the transaction client device or a second transaction client device.

7. The system as recited in claim 6, where one or both of the first transaction user interface and the second transaction user interface corresponds to a single-transaction user interface.

8. One or more non-transitory, processor-readable media storing computer-executable instructions that, when executed by one or more processing devices, cause the one or more processing devices to perform operations comprising:
processing specifications for a first set of rules received from a first system that is remote from the one or more processing devices, the first set of rules to be applied to one or more secure transactions supported by a transaction user interface;
processing transaction sender data and transaction receiver data received from a transaction client device;
using the specifications for the first set of rules, determining a first set of interface components as a function of the first set of rules to create a first transaction user interface;
configuring the first transaction user interface with the first set of interface components as a function of the first set of rules to create the first transaction user interface;

determining a first expiration time associated with the first transaction user interface;
determining a first content delivery network server of a plurality of content delivery options, the plurality of content delivery options comprising a second content delivery network server that is distinct from the first content delivery network server and that is associated with a prior version of the first transaction user interface, where the prior version is not valid according to the first set of rules, and the first transaction user interface is valid according to the first set of rules; and
transmitting data associated with the first transaction user interface to the first content delivery network server to facilitate the first transaction user interface to the transaction client device.

9. The one or more non-transitory, processor-readable media as recited in claim 8, where the first expiration time associated with the first transaction user interface is determined based at least in part on the specifications for the first set of rules received from the first system that is remote from the one or more processing devices.

10. The one or more non-transitory, processor-readable media as recited in claim 9, where the transmitting the data associated with the first transaction user interface to the first content delivery network server to facilitate the first transaction user interface to the transaction client device comprises specifying the first expiration time for the first content delivery network server to enforce.

11. The one or more non-transitory, processor-readable media as recited in claim 10, where, after the first expiration time, the first content delivery network server does not facilitate the first transaction user interface to the transaction client device.

12. The one or more non-transitory, processor-readable media as recited in claim 11, the operations comprising:
processing specifications for a second set of rules received from a second system that is remote from the one or more processing devices, where the second set of rules is different from the first set of rules, and the second system is different from the first system;
processing second transaction sender data and second transaction receiver data received from a second transaction client device;
using the specifications for the second set of rules, determining a second set of interface components as a function of the second set of rules to create a second transaction user interface, where the second set of interface components is different from the first set of interface components; and
configuring a second transaction user interface with the second set of interface components as a function of the second set of rules to create the second transaction user interface.

13. The one or more non-transitory, processor-readable media as recited in claim 12, the operations comprising:
determining a second expiration time associated with the second transaction user interface, where second expiration time is different from the first expiration time;
determining a third content delivery network server of the plurality of content delivery options; and
transmitting second data associated with the second transaction user interface to the third content delivery network server to facilitate the second transaction user interface to the transaction client device or a second transaction client device.

14. The one or more non-transitory, processor-readable media as recited in claim 13, where one or both of the first transaction user interface and the second transaction user interface corresponds to a single-transaction user interface.

15. A method comprising:
receiving specifications for a first set of rules from a first system that is remote from one or more processing devices, the first set of rules to be applied to one or more secure transactions supported by a transaction user interface;
receiving from a transaction client device, transaction sender data and transaction receiver data;
using the specifications for the first set of rules, determining a first set of interface components as a function of the first set of rules to create a first transaction user interface;
configuring the first transaction user interface with the first set of interface components as a function of the first set of rules to create the first transaction user interface;
determining a first expiration time associated with the first transaction user interface;
determining a first content delivery network server of a plurality of content delivery options, the plurality of content delivery options comprising a second content delivery network server that is distinct from the first content delivery network server and that is associated with a prior version of the first transaction user interface, where the prior version is not valid according to the first set of rules, and the first transaction user interface is valid according to the first set of rules; and
transmitting data associated with the first transaction user interface to the first content delivery network server to facilitate the first transaction user interface to the transaction client device.

16. The method as recited in claim 15, where the first expiration time associated with the first transaction user interface is determined based at least in part on the specifications for the first set of rules received from the first system that is remote from the one or more processing devices.

17. The method as recited in claim 16, where the transmitting the data associated with the first transaction user interface to the first content delivery network server to facilitate the first transaction user interface to the transaction client device comprises specifying the first expiration time for the first content delivery network server to enforce.

18. The method as recited in claim 17, where, after the first expiration time, the first content delivery network server does not facilitate the first transaction user interface to the transaction client device.

19. The method as recited in claim 18, further comprising:
receiving specifications for a second set of rules from a second system that is remote from the one or more processing devices, where the second set of rules is different from the first set of rules, and the second system is different from the first system;
receiving, from a second transaction client device, second transaction sender data and second transaction receiver data;
using the specifications for the second set of rules, determining a second set of interface components as a function of the second set of rules to create a second transaction user interface, where the second set of interface components is different from the first set of interface components; and
configuring a second transaction user interface with the second set of interface components as a function of the second set of rules to create the second transaction user interface.

20. The method as recited in claim 19, further comprising:
determining a second expiration time associated with the second transaction user interface, where second expiration time is different from the first expiration time;
determining a third content delivery network server of the plurality of content delivery options; and
transmitting second data associated with the second transaction user interface to the third content delivery network server to facilitate the second transaction user interface to the transaction client device or a second transaction client device.

* * * * *